US012553987B2

(12) United States Patent
Dhekne et al.

(10) Patent No.: US 12,553,987 B2
(45) Date of Patent: Feb. 17, 2026

(54) ULTRAWIDEBAND LOCALIZATION SYSTEMS AND METHODS FOR COMPUTING USER INTERFACE

(71) Applicant: GEORGIA TECH RESEARCH CORPORATION, Atlanta, GA (US)

(72) Inventors: Ashutosh Dhekne, Marietta, GA (US); Yifeng Cao, Atlanta, GA (US); Mostafa H. Ammar, Atlanta, GA (US)

(73) Assignee: Georgia Tech Research Corporation, Atlanta, GA (US)

(*) Notice: Subject to any disclaimer, the term of this patent is extended or adjusted under 35 U.S.C. 154(b) by 289 days.

(21) Appl. No.: 18/558,861

(22) PCT Filed: May 3, 2022

(86) PCT No.: PCT/US2022/027435
§ 371 (c)(1),
(2) Date: Nov. 3, 2023

(87) PCT Pub. No.: WO2022/235642
PCT Pub. Date: Nov. 10, 2022

(65) Prior Publication Data
US 2024/0230831 A1 Jul. 11, 2024

Related U.S. Application Data

(60) Provisional application No. 63/183,826, filed on May 4, 2021.

(51) Int. Cl.
G01S 5/06 (2006.01)
G01S 5/02 (2010.01)

(52) U.S. Cl.
CPC ............... G01S 5/06 (2013.01); G01S 5/021 (2013.01); G01S 5/02216 (2020.05); G01S 5/0247 (2013.01); G01S 5/0264 (2020.05)

(58) Field of Classification Search
CPC ...... G01S 5/06; G01S 5/02216; G01S 5/0264; G01S 5/021; G01S 5/0247
(Continued)

(56) References Cited

U.S. PATENT DOCUMENTS

2010/0109842 A1* 5/2010 Patel ............... G01C 21/206
340/10.1
2014/0070958 A1* 3/2014 Foo ............... A61B 5/742
340/870.07
(Continued)

OTHER PUBLICATIONS

International Search Report and Written Opinion received in PCT/US2022/027435 mailed Jul. 14, 2022.
(Continued)

Primary Examiner — Bo Fan
(74) Attorney, Agent, or Firm — Meunier Carlin & Curfman LLC

(57) ABSTRACT

An exemplary system and method are disclosed for a handheld or hand-enclosed instrument configured with ultra-wideband localization using unidirectional messaging protocol based on time difference of arrival (TDoA) measurements that can be used as inputs, in a realtime control loop, to a software application that uses the handheld or hand-enclosed instrument as an input user interface. The handheld or hand-enclosed instrument can be readily employed for UI in large work areas (e.g., 2D), such as a whiteboard or wallboard, with sub-millimeter resolution and sub-millisecond latency. The handheld or hand-enclosed instrument can be readily employed in a UI device for non-conforming 3D workspace such as a sculpting instrument, in hand-enclosed game interface, as a remote medical instrument, among others described herein.

20 Claims, 16 Drawing Sheets

(58) Field of Classification Search
USPC ...... 342/352, 357.27, 357.69, 458; 340/10.1, 340/870.07
See application file for complete search history.

(56) References Cited

U.S. PATENT DOCUMENTS

2016/0242135 A1* 8/2016 McLaughlin ...... H04B 1/71637
2019/0076203 A1* 3/2019 Ang ........................ A61B 90/98

OTHER PUBLICATIONS

Khan et at, "Hand-based gesture recognition for vehicular applications using IR-UWB radar." Sensors 17.4 (2017): 833. Apr. 11, 2017 (Apr. 11, 2017) Retrieved on Jun. 19, 2022 (Jun. 19, 2022) from <https://www.mdpi.com/1424-8220/17/4/833> entire document.

Wang et at. "Prototyping and experimental comparison of iR-UWB based high precision localization technologies." 2015 IEEE 12th Intl Conf on Ubiquitous Intelligence and Computing and 2015 IEEE 12th Intl Conf on Autonomic and Trusted Computing and 2015 IEEE 15th Intl Conf on Scalable Computing and Communications and Its Associated Workshops (UIC-ATC-ScalCom). IEEE, 2016. Aug. 14, 2015 (Aug. 14, 2015) Retrieved on Jun. 19, 2022 (Jun. 19, 2022) from <https://ieeexplorejeee.org/abstract/document/7518395> entire document.

Wang et al., "MoLe: Motion leaks through smartwatch sensors." Proceedings of the 21st annual international conference on mobile computing and networking (2015): 1-12.

Wang et al., "No need to war-drive: Unsupervised indoor localization." Proceedings of the 10th international conference on Mobile systems, applications, and services (2012): 197-210.

Wang et al., "RF-IDraw: Virtual touch screen in the air using RF signals." ACM SIGCOMM Computer Communication Review 44.4 (2014): 235-246.

Wei et al., "mtrack: High-precision passive tracking using millimeter wave radios." Proceedings of the 21st Annual International Conference on Mobile Computing and Networking (2015): 1-13.

Wu et al., "FingerDraw: Sub-wavelength level finger motion tracking with WiFi signals." Proceedings of the ACM on Interactive, Mobile, Wearable and Ubiquitous Technologies 4.1 (2020): 1-28.

Xiao et al., "MilliBack: Real-time plug-n-play millimeter level tracking using wireless backscattering." Proceedings of the ACM on Interactive, Mobile, Wearable and Ubiquitous Technologies 3.3 (2019): 1-23.

Xu et al., "Finger-writing with smartwatch: A case for finger and hand gesture recognition using smartwatch." Proceedings of the 16th International Workshop on Mobile Computing Systems and Applications (2015): 9-14.

Xu et al., "SCPL: Indoor device-free multi-subject counting and localization using radio signal strength." Proceedings of the 12th international conference on Information Processing in Sensor Networks (2013): 1-12.

Yang et al., "Tagoram: Real-time tracking of mobile RFID tags to high precision using COTS devices." Proceedings of the 20th annual international conference on Mobile computing and networking (2014): 1-12.

Yean et al., "Algorithm for 3D orientation estimation based on Kalman Filter and Gradient Descent." 2016 IEEE 7th Annual Information Technology, Electronics and Mobile Communication Conference (IEMCON). IEEE (2016): 1-7.

Yin et al., "Learning to recognize handwriting input with acoustic features." Proceedings of the ACM on Interactive, Mobile, Wearable and Ubiquitous Technologies 4.2 (2020): 1-26.

Yu et al., "Mobile devices based eavesdropping of handwriting." IEEE Transactions on Mobile Computing 19.7 (2019): 1-14.

Yun et al., "Strata: Fine-grained acoustic-based device-free tracking." Proceedings of the 15th annual international conference on mobile systems, applications, and services (2017): 1-14.

Yun et al., "Turning a mobile device into a mouse in the air." Proceedings of the 13th Annual International Conference on Mobile Systems, Applications, and Services (2015): 1-15.

Zhou et al., "EchoPrint: Two-factor authentication using acoustics and vision on smartphones." Proceedings of the 24th Annual International Conference on Mobile Computing and Networking (2018): 321-336.

Adib et al., "3D tracking via body radio reflections." 11th USENIX Symposium on Networked Systems Design and Implementation (NSDI 14). (2014): 316-329.

Adib et al., "See through walls with WiFi!." Proceedings of the ACM SIGCOMM 2013 conference on SIGCOMM (2013): 75-86.

AN5019, "Magnetic calibration algorithms." NXP Semiconductors. https://www.nxp.com/docs/en/application-note/AN5019.pdf (2016): 1-33.

Anderson et al., "Nearly one-in-five teens can't always finish their homework because of the digital divide." Pew Research Center. https://www.pewresearch.org/fact-tank/2018/10/26/ Oct. 2018, 1-6.

Apple, "Dream it up. Jot it down." Apple Pencil. https://www.apple.com/apple-pencil/ (2018): 1-12.

Bai et al., "Acoustic-based sensing and applications: A survey." Computer Networks 181 (2020): 107447, 1-23.

Boxlight Corporation, "Mimiocapture ink recorder datasheet." Boxlight. https://mimio.boxlight.com/wp-content/uploads/2017/03/MimioCapture_SellSheet.pdf (2016): 1-2.

Cao et al., "6Fit-A-part: a protocol for physical distancing on a custom wearable device." 2020 IEEE 28th International Conference on Network Protocols (ICNP). IEEE (2020): 1-12.

Cao et al., "Earphonetrack: involving earphones into the ecosystem of acoustic motion tracking." Proceedings of the 18th Conference on Embedded Networked Sensor Systems (2020): 1-14.

Decawave, "Decawave user manual." Decawave. https://www.decawave.com/sites/default/files/ resources/dw1000_user_manual_2.11.pdf (2017).

Decawave, "Transmit power calibration and management." Decawave. https://www.decawave.com/wp-content/uploads/2019/07/APS023_Part- 1_Transmit_Power_Calibration_Management.pdf (2019).

Dhekne et al., "TrackIO: Tracking First Responders {Inside-Out}." 16th USENIX Symposium on Networked Systems Design and Implementation (NSDI 19). (2019): 750-764.

Feigl et al., "RNN-aided human velocity estimation from a single IMU." Sensors 20.13 (2020): 3656, 1-30.

FT Series, "4-wire analog resistive touch screen datasheet." Digikey. https://media.digikey.com/pdf/Data%20Sheets/NKK%20PDFs/FT_Series_4-Wire_Ds_Oct_2017.pdf (2017).

Gowda et al., "Bringing IoT to sports analytics." 14th USENIX Symposium on Networked Systems Design and Implementation (NSDI 17). (2017): 498-514.

Gowda et al., "Tracking drone orientation with multiple GPS receivers." Proceedings of the 22nd annual international conference on mobile computing and networking (2016): 280-293.

Großwindhager et al., "SALMA: UWB-based single-anchor localization system using multipath assistance." Proceedings of the 16th ACM Conference on Embedded Networked Sensor Systems (2018): 1-13.

Guo et al., "The soft iron and hard iron calibration method using extended Kalman filter for attitude and heading reference system." 2008 IEEE/ION Position, Location and Navigation Symposium. IEEE (2008): 1167-1174.

Gutierrez et al., "IEEE 802.15. 4 low-rate wireless personal area networks: Enabling wireless sensor networks." IEEE Standards Office (2003).

Hemingway et al., "Perspectives on Euler angle singularities, gimbal lock, and the orthogonality of applied forces and applied moments." Multibody system dynamics 44 (2018): 31-56.

Ho et al., "An accurate algebraic solution for moving source location using TDOA and FDOA measurements." IEEE Transactions on Signal Processing 52.9 (2004): 2452-2463.

Ho et al., "Step-detection and adaptive step-length estimation for pedestrian dead-reckoning at various walking speeds using a smartphone." Sensors 16.9 (2016): 1423, 1-13.

Hongzhao, "60 GHz RSS localization with omni-directional and horn antennas." ScholarBank@NUS Repository (2010).

(56) References Cited

OTHER PUBLICATIONS

Howard et al., "A review of current ultrasound exposure limits." The Journal of Occupational Health and Safety of Australia and New Zealand 21.3 (2005): 1-10.

Huang et al., "Shake and walk: Acoustic direction finding and fine-grained indoor localization using smartphones." IEEE INFOCOM 2014—IEEE Conference on Computer Communications. IEEE (2014): 1-10.

IEEE Standard for Low-Rate Wireless Networks "IEEE Std 802.15. Apr. 2015 (Revision of IEEE Std 802.15. Apr. 2011)." IEEE (2016): 1-709.

Jiang et al., "mmVib: micrometer-level vibration measurement with mmwave radar." Proceedings of the 26th Annual International Conference on Mobile Computing and Networking (2020): 1-13.

Kempke et al., "Surepoint: Exploiting ultra wideband flooding and diversity to provide robust, scalable, high-fidelity indoor localization." Proceedings of the 14th ACM Conference on Embedded Network Sensor Systems CD-ROM (2016): 1-13.

Li et al., "Effective adaptive Kalman filter for MEMS-IMU/magnetometers integrated attitude and heading reference systems." The Journal of Navigation 66.1 (2013): 1-16.

Liu et al., "Push the limit of WiFi based localization for smartphones." Proceedings of the 18th annual international conference on Mobile computing and networking (2012): 1-12.

Liu et al., "Real-time arm skeleton tracking and gesture inference tolerant to missing wearable sensors." Proceedings of the 17th Annual International Conference on Mobile Systems, Applications, and Services (2019): 287-299.

Mahony et al., "Nonlinear complementary filters on the special orthogonal group." IEEE Transactions on automatic control 53.5 (2008): 1-17.

Mao et al., "Cat: high-precision acoustic motion tracking." Proceedings of the 22nd Annual International Conference on Mobile Computing and Networking (2016): 69-81.

Microsoft, "Change handwritten ink to shapes, text, or math in powerpoint for microsoft 365." Microsoft. https://support.microsoft.com/en-us/topic/changehandwritten-ink-to-shapes-text-or-math-in-powerpoint-for-microsoft-365-0740dec3-6291-4c1f-8baa-011d18449919 (2020): 1-6.

Microsoft, "Surface Pen." Microsoft. https://news.microsoft.com/uploads/2017/05/SurfacePenFS.pdf (2017): 1-3.

Nandakumar et al., "Fingerio: Using active sonar for fine-grained finger tracking." Proceedings of the 2016 CHI Conference on Human Factors in Computing Systems (2016): 1515-1525.

Parate et al., "RisQ: Recognizing smoking gestures with inertial sensors on a wristband." Proceedings of the 12th annual international conference on Mobile systems, applications, and services (2014): 1-38.

Patwari et al., "Breathfinding: A wireless network that monitors and locates breathing in a home." IEEE Journal of Selected Topics in Signal Processing 8.1 (2013): 1-10.

Ramer, U., "An iterative procedure for the polygonal approximation of plane curves." Computer graphics and image processing 1.3 (1972): 244-256.

Roy et al., "Backdoor: Making microphones hear inaudible sounds." Proceedings of the 15th Annual International Conference on Mobile Systems, Applications, and Services (2017): 2-14.

Roy et al., "Inaudible voice commands: The {Long-Range} attack and defense." 15th USENIX Symposium on Networked Systems Design and Implementation (NSDI 18). (2018): 546-560.

Samsung, "S pen." Samsung. https://www.samsung.com/global/galaxy/galaxy-note10/s-pen/ (2018): 1-2.

Sensonor, "STIM3000." Safran. https://www.sensonor.com/products/inertial-measurement-units/stim300/ Jun. 2020, 1-3.

Shangguan et al., "Leveraging electromagnetic polarization in a two-antenna whiteboard in the air." Proceedings of the 12th International on Conference on emerging Networking Experiments and Technologies (2016): 443-456.

Shen et al., "I am a smartwatch and i can track my user's arm." Proceedings of the 14th annual international conference on Mobile systems, applications, and services (2016): 85-96.

Sullivan, "COVID-19 Has Widened the Homework Gap Into a Full-Fledged Learning Gap." Diversity and Equity. Ed Surge. https://www.edsurge.com/news/ Jul. 2020, 1-5.

Sun et al., "Depth aware finger tapping on virtual displays." Proceedings of the 16th Annual International Conference on Mobile Systems, Applications, and Services (2018): 283-295.

Sun et al., "Vskin: Sensing touch gestures on surfaces of mobile devices using acoustic signals." Proceedings of the 24th Annual International Conference on Mobile Computing and Networking (2018): 1-15.

Wang et al., "Device-free gesture tracking using acoustic signals." Proceedings of the 22nd Annual International Conference on Mobile Computing and Networking (2016): 82-94.

Wang et al., "MAVL: Multiresolution analysis of voice localization." 18th USENIX Symposium on Networked Systems Design and Implementation (NSDI 21). (2021): 844-858.

* cited by examiner

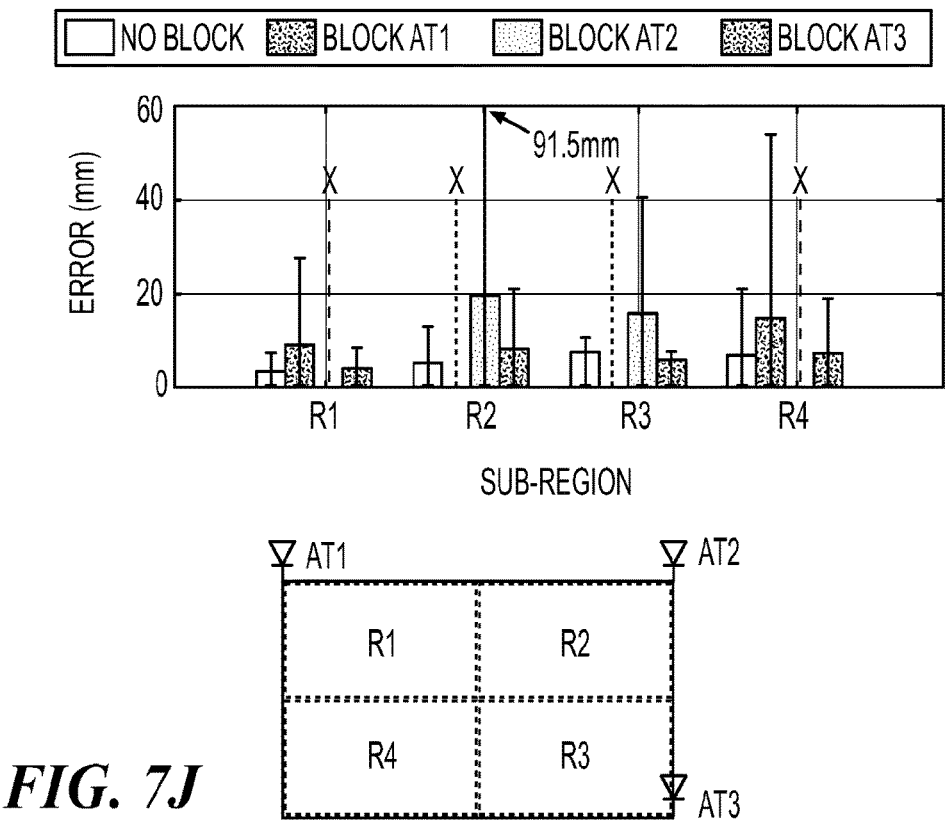
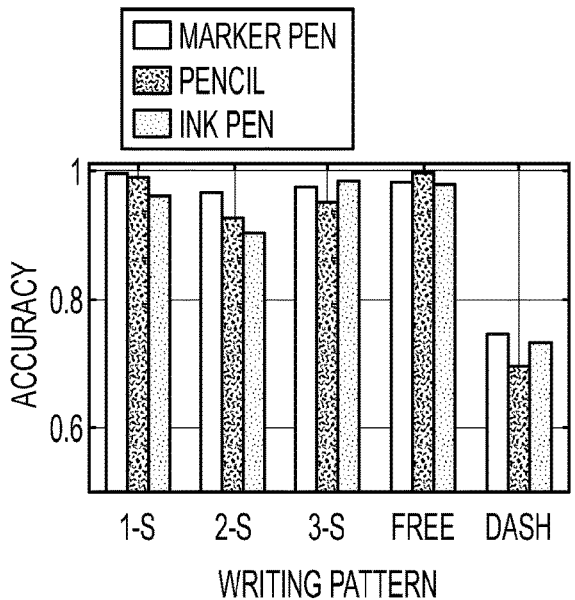
FIG. 7J
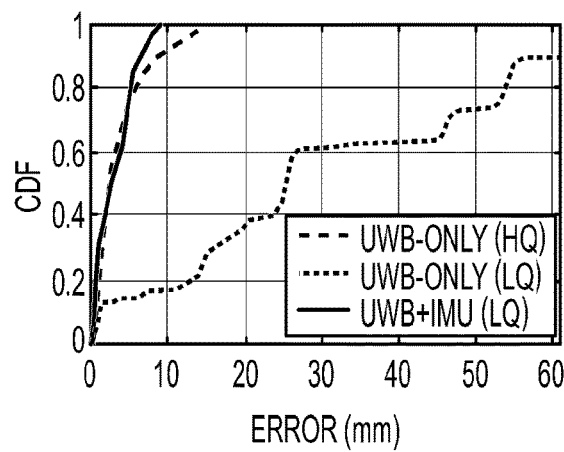
FIG. 7K  FIG. 7L

ULTRAWIDEBAND LOCALIZATION SYSTEMS AND METHODS FOR COMPUTING USER INTERFACE

RELATED APPLICATION

This application is a U.S. National Stage application filed under 35 U.S.C. § 371 of PCT/US2022/027435 filed on May 3, 2022 which claims the benefit of U.S. Provisional Patent Application No. 63/183,826, filed May 4, 2021, entitled "ITrackU: Tracking a Pen-like Instrument via UWB-IMU Fusion," each of which is incorporated by reference herein in its entirety.

This invention was made with government support under Grant No. GR00005128 from the National Science Foundation. The government has certain rights in the invention.

TECHNICAL FIELD

The present disclosure relates to wireless localization systems, specifically, an ultra-wideband (UWB) localization systems for handheld or hand-enclosed instruments.

BACKGROUND

Hand-held pointing devices that can detect two-dimensional motion relative to a surface, such as a computer mouse, are ubiquitous user interface devices for computing applications. Another class of user interface devices employ touchscreen technology that can sense, e.g., via capacitive sensors or other sensors, input or motion on an instrumented surface having such sensors. For applications having large surface areas of user input, it can be impractical to employ the sensing of relative two-dimensional motion such as with traditional hand-held pointing devices as the user interface. It can be impractical, and costly, to employ current touchscreen technology over such large surface areas.

Localization methodology based on RF signals, acoustics, magnetometer, or the like can provide an alternative approach to traditional hand-held pointing device and touchscreen technology, but often exhibit poor accuracy for large areas of localization. High precision localization are needed for real-time control application.

There are benefits to improving localization systems that can be used in user interface applications.

SUMMARY

An exemplary system and method are disclosed for a handheld or hand-enclosed instrument configured with ultra-wideband localization using unidirectional messaging protocol based on time difference of arrival (TDoA) measurements that can be used as inputs, in a real-time control loop, to a software application that uses the handheld or hand-enclosed instrument as an input user interface. The handheld or hand-enclosed instrument can be readily employed for UI in large work areas (e.g., 2D), such as a whiteboard or wallboard, with sub-millimeter resolution and sub-millisecond latency. The handheld or hand-enclosed instrument can be readily employed in a UI device for non-conforming 3D workspace such as a sculpting instrument, in hand-enclosed game interface, as a remote medical instrument, among others described herein.

The unidirectional UWB localization operation and protocol can be used in combination with orientation sensors and/or contact-associated sensors embedded in the handheld or hand-enclosed instrument to provide fused high precision and accurate UI input for real-time computing UI applications. In some embodiments, the precise ultra-wideband localization system is configured with a single multi-antenna UWB receiver that can be located outside the work surface to capture the instrument's location.

In an aspect, a system is disclosed comprising a localization device (e.g., base station) configured to interface to a handheld or hand-enclosed instrument (e.g., writing instrument, sculpting instrument, surgical instrument, hand-held gaming device or glove, computer hand-held pointing device, etc.) comprising an instrument body and an ultra-wide band antenna and communication interface, the localization device comprising a plurality of antennas (e.g., at least 3) operably connected to an ultra-wide band controller to transmit and receive a plurality of ultra-wide band signals (e.g., analog or digital channel that can provide millimeter or sub-millimeter localization accuracy for a given sampling rate) from the ultra-wide band antenna of the handheld or hand-enclosed instrument; and the controller comprising a processor unit or logic circuit, the processor unit or logic circuit being configured to: measure a plurality of time measurements and one or more phase measurements of a plurality of signals received by the plurality of antennas from the ultra-wide band antenna of the handheld or hand-enclosed instrument; determine a time-difference of arrival (TDOA) measurements (or phase-difference of arrival (PDoA)), or values derived therefrom, using the plurality of measured time measurements and the one or more measured phase measurements; and determine at least one localization measurement value of the ultra-wide band antenna of the handheld or hand-enclosed instrument based on the TDOA measurements, or values derived therefrom; wherein at least the at least one localization measurement value or a parameter derived therefrom (e.g., position, speed, acceleration, or derived localization of the landmark on the instrument) is employed as one or more inputs, in a real-time control loop, to a software application that uses the handheld or hand-enclosed instrument as an input user interface.

In another aspect, a system (e.g., wherein the handheld or hand-enclosed instrument or robot is the receiver of the UWB signal) is disclosed comprising an ultra-wide band antenna and communication interface; and a controller, the controller comprising a second processor unit and a second memory having instructions stored thereon, wherein execution of the instructions by the second processor cause the second processor to: measure a plurality of time measurements and one or more phase measurements of a plurality of signals received by the ultra-wide band antenna from a plurality of antennas of a base station system; determine time-difference of arrival (TDOA) measurements (or phase-difference of arrival (PDoA)), or values derived therefrom, using the plurality of measured time measurements and the one or more measured phase measurements; and determine at least one localization measurement value of the ultra-wide band antenna of the handheld or hand-enclosed instrument based on the TDOA measurements, or values derived therefrom, wherein at least the at least one localization measurement value or a parameter derived therefrom is employed as one or more inputs, in a real-time control loop, to a software application that uses the handheld or hand-enclosed instrument as an input user interface.

In some embodiments, two or more of the plurality of antennas are connected to the controller through a corresponding set of delay-adjusting connections, including a first delay-adjusting connection and a second delay-adjusting connection, wherein the first delay-adjusting connection comprises a first cable length and/or electronic component that add a first time or phase delay to (i) a first time measurement of the plurality of time measurements and/or a first phase measurement of the one or more phase measurements, wherein the second delay-adjusting connection comprises a second cable length and/or electronic component that add a second time or phase delay to (i) a second time measurement of the plurality of time measurements and/or a second phase measurement of the one or more phase measurements, and wherein the first time or phase delay and the second time or phase delay are different (e.g., wherein the difference is greater than a pre-defined margin associated with multipath variability and/or local interference variability).

In some embodiments, the first delay-adjusting connection has a first signal amplitude attenuation characteristic, wherein the second delay-adjusting connection has a second signal amplitude attenuation characteristic, wherein the first signal amplitude attenuation characteristic is different from the second signal amplitude attenuation characteristic.

In some embodiments, the plurality of unidirectional ultra-wide band signals comprises a plurality of RF pulses, wherein the measure of the plurality of time measurements and the one or more phase measurements of a plurality of unidirectional signals includes: interpolating (e.g., via an up-sampling operation) a portion of the plurality of RF pulses associated with a peak RF pulse to generate a plurality of interpolated signals; and determining a maximum measure of the plurality of interpolated signals as the plurality of time measurements and the one or more phase measurements.

In some embodiments, the handheld or hand-enclosed instrument comprises an orientation sensor (e.g., inertial measurement unit (IMU) comprising one or more orientation sensors (e.g., gyroscope) and/or accelerometers), and wherein the processor unit (or second processor unit) is further configured by instructions or circuitry to: receive orientation measurements, or values derived therefrom, from the orientation sensor; determine at least one orientation measurement value based on the orientation measurements; and determine at least one second localization measurement value of a landmark (e.g., tip of a writing instrument or various described instruments, finger tip of the glove or other location on the glove) of the handheld or hand-enclosed instrument via a pre-defined transform operator of (i) the at least one orientation measurement value (e.g., angle, acceleration, measured gyroscopic force with respect to a 3-D frame, a 2D frame, or a 1D frame) and (ii) at least one of the (a) TDOA measurements (or phase-difference of arrival (PDoA)), or values derived therefrom or (b) the at least one localization measurement value of the ultra-wide band antenna, wherein the at least one second localization measurement value or a parameter derived therefrom is employed as one or more inputs, in the real-time control loop, to a software application that uses the handheld or hand-enclosed instrument as an input user interface.

In some embodiments, the handheld or hand-enclosed instrument comprises an orientation sensor and a contact sensor, and wherein the processor unit (or second processor unit) is further configured by instructions or circuitry to: receive orientation measurements, or values derived therefrom, from the orientation sensor; receive contact measurements, or values derived therefrom, from the contact sensor; determine at least one contact measurement value (e.g., binary value indicating contact or variable value indicating pressure) based on the contact measurements; and determine at least one second localization measurement value of a landmark (e.g., tip of a writing instrument or various described instruments, finger tip of the glove or other location on the glove) of the handheld or hand-enclosed instrument via a pre-defined transform operator using: (i) the at least one orientation measurement value and (ii) at least one of the (a) TDOA measurements (or phase-difference of arrival (PDoA)), or values derived therefrom or (b) the at least one localization measurement value of the ultra-wide band antenna, wherein at least (i) the at least one second localization measurement value or a parameter derived therefrom and (ii) the at least one contact measurement value are concurrently employed as one or more inputs, in the real-time control loop, to a software application that uses the handheld or hand-enclosed instrument as an input user interface.

In some embodiments, the handheld or hand-enclosed instrument comprises an orientation sensor, and wherein the processor unit (or second processor unit) is further configured by instructions or circuitry to: receive orientation measurements, or values derived therefrom, from the orientation sensor; and determine at least one orientation measurement value based on the orientation measurements, wherein at least (i) the at least one localization measurement value or a parameter derived therefrom and (ii) the at least one orientation measurement value are concurrently employed as one or more inputs, in the real-time control loop, to a software application that uses the handheld or hand-enclosed instrument as an input user interface (e.g., wherein the software application performs the transform operation to determine a localization value for a landmark on or of the handheld or hand-enclosed instrument).

In some embodiments, the handheld or hand-enclosed instrument comprises an orientation sensor and a contact sensor, and wherein the processor unit (or second processor unit) is further configured by instructions or circuitry to: receive orientation measurements, or values derived therefrom, from the orientation sensor; receive contact measurements, or values derived therefrom, from the contact sensor; determine at least one contact measurement value based on the contact measurements; and determine at least one orientation measurement value based on the orientation measurements, wherein at least (i) the at least one localization measurement value or a parameter derived therefrom, (ii) the at least one orientation measurement value, and (iii) the at least one contact measurement value are concurrently employed as one or more inputs, in the real-time control loop, to a software application that uses the handheld or hand-enclosed instrument as an input user interface (e.g., wherein the software application performs the transform operation to determine a localization value for a landmark on or of the handheld or hand-enclosed instrument).

In some embodiments, the controller is configured to maintain a first tracking parameter of the plurality of time measurements and/or the one or more phase measurements, and wherein the controller is further configured to re-calibrate and/or adjust the first tracking parameter via a fusion operation using at least outputs of the orientation sensor.

In some embodiments, the controller is configured to maintain a second tracking parameter of the orientation measurements, and wherein the controller is further configured to re-calibrate and/or adjust the tracking parameter via the fusion operation using the second tracking parameter.

In some embodiments, the contact sensor comprises a pressure sensor positioned on a surface of the instrument body to be held by a user, and wherein contact is determined based on an elevated pressure being sensed by the pressure sensor (e.g., due to gripping of the user's hand).

In some embodiments, the contact sensor comprises a laser rangefinder or a photodiode assembly configured to interrogate a surface (e.g., a writing board or a workpiece) to determine when contact is made with said surface.

In some embodiments, (i) the orientation measurements, or values derived therefrom, and/or (ii) the contact measurements, or values derived therefrom, are embedded and/or encoded in the plurality of signals (e.g., same data channel as used for the localization).

In some embodiments, (i) the orientation measurements, or values derived therefrom, and/or (ii) the contact measurements, or values derived therefrom, are transmitted through (i) a second communication channel in at least one of the plurality of ultra-wide band signals or (ii) a separate second communication channel (e.g., ultra-wide and or Wi-Fi or Bluetooth, or other RF technology) associated with the localization device.

In some embodiments, the localization device further comprises a second ultra-wide band controller or a RF controller configured to receive the orientation measurements, or values derived therefrom, and/or the contact measurements, or values derived therefrom, from the hand-held or hand-enclosed instrument.

In some embodiments, the hand-held or hand-enclosed instrument is configured as a writing instrument, the system further comprising a writing surface apparatus (e.g., computerized or non-computerized writing surface) having a dimension greater than 2 feet by 3 feet (specification will list different sizes), wherein the plurality of antennas are positioned at a first position, a second position, and a third position on or near the writing surface apparatus.

In some embodiments, the hand-held instrument is configured as a sculpting instrument, wherein the plurality of antennas are fixably positioned at a first position, a second position, and a third position around a surface of a workpiece, and wherein the localization device is configured to map or operate upon a three-dimensional surface position of the workpiece using (i) the at least one localization measurement value or (ii) the at least one second localization measurement value.

In another aspect, a non-transitory computer-readable medium is disclosed having instructions stored thereon to perform localization of a hand-held or hand-enclosed instrument, wherein execution of the instructions by the processor causes the processor to: receive a plurality of time measurements and one or more phase measurements of a plurality of signals received by the plurality of antennas from the ultra-wide band antenna of the handheld or hand-enclosed instrument; determine a time-difference of arrival (TDOA) measurements (or phase-difference of arrival (PDoA)), or values derived therefrom, using the plurality of measured time measurements and the one or more measured phase measurements (e.g., derived phase difference of arrival (PDOA)); and determine at least one localization measurement value of the ultra-wide band antenna of the handheld or hand-enclosed instrument based on the TDOA measurements (or phase-difference of arrival (PDoA)), or values derived therefrom, wherein the at least one localization measurement value or a parameter derived therefrom (e.g., position, speed, acceleration, or derived localization of the landmark on the instrument) is employed, in a real-time control loop, as one or more inputs to a software application that uses the handheld or hand-enclosed instrument as an input user interface.

In some embodiments, the processor unit or logic circuit is further configured to: receive orientation measurements, or values derived therefrom, from the orientation sensor; determine at least one orientation measurement value based on the orientation measurements; and determine at least one second localization measurement value of a landmark (e.g., tip of a writing instrument or various described instruments, finger tip of the glove or other location on the glove) of the handheld or hand-enclosed instrument via a pre-defined transform operator of (i) the at least one orientation measurement value (e.g., angle, acceleration, measured gyroscopic force with respect to a 3-D frame, a 2D frame, or a 1D frame) and (ii) at least one of the (a) TDOA measurements (or PDOA measurements), or values derived therefrom or (b) the at least one localization measurement value of the ultra-wide band antenna, wherein the at least one second localization measurement value or a parameter derived therefrom is employed as one or more inputs to a software application that uses the handheld or hand-enclosed instrument as an input user interface.

In some embodiments, the handheld or hand-enclosed instrument comprises an orientation sensor and a contact sensor, and the processor unit (or second processor unit) is further configured by instructions or circuitry to: receive orientation measurements, or values derived therefrom, from the orientation sensor; receive contact measurements, or values derived therefrom, from the contact sensor; determine at least one contact measurement value (e.g., binary value indicating contact or variable value indicating pressure) based on the contact measurements; and determine at least one second localization measurement value of a landmark (e.g., tip of a writing instrument or various described instruments, finger tip of the glove or other location on the glove) of the handheld or hand-enclosed instrument via a pre-defined transform operator using: (i) the at least one orientation measurement value and (ii) at least one of the (a) TDOA measurements (or phase-difference of arrival (PDoA)), or values derived therefrom or (b) the at least one localization measurement value of the ultra-wide band antenna, wherein at least (i) the at least one second localization measurement value or a parameter derived therefrom and (ii) the at least one contact measurement value are concurrently employed as one or more inputs to a software application that uses the handheld or hand-enclosed instrument as an input user interface.

In some embodiments, the handheld or hand-enclosed instrument comprises an orientation sensor, and the processor unit (or second processor unit) is further configured by instructions or circuitry to: receive orientation measurements, or values derived therefrom, from the orientation sensor; and determine at least one orientation measurement value based on the orientation measurements, wherein at least (i) the at least one localization measurement value or a parameter derived therefrom and (ii) the at least one orientation measurement value are concurrently employed as one or more inputs to a software application that uses the handheld or hand-enclosed instrument as an input user interface (e.g., wherein the software application performs the transform operation to determine a localization value for a landmark on or of the handheld or hand-enclosed instrument).

In some embodiments, the handheld or hand-enclosed instrument comprises an orientation sensor and a contact sensor, and the processor unit (or second processor unit) is further configured by instructions or circuitry to: receive orientation measurements, or values derived therefrom, from the orientation sensor; receive contact measurements, or values derived therefrom, from the contact sensor; determine at least one contact measurement value based on the contact measurements; and determine at least one orientation measurement value based on the orientation measurements, wherein at least (i) the at least one localization measurement value or a parameter derived therefrom, (ii) the at least one orientation measurement value, and (iii) the at least one contact measurement value are concurrently employed as one or more inputs to a software application that uses the handheld or hand-enclosed instrument as an input user interface (e.g., wherein the software application performs the transform operation to determine a localization value for a landmark on or of the handheld or hand-enclosed instrument).

In some embodiments, the computer-readable medium is configured to operate on any one of the above-discussed system.

In another aspect, a method is disclosed comprising: transmitting by a first device (e.g., a writing instrument having 1 transmitter/receiver or a base station having three transmitters/receivers) one or more ultra-wide band signals; receiving by a second device (the base station having the three transmitters/receivers or the writing instrument having 1 transmitter/receiver) the transmitted one or more ultra-wide band signals; measuring, via analog and/or digital circuitries, a plurality of time measurements and one or more phase measurements of a plurality of signals received by the plurality of antennas from the ultra-wide band antenna of the handheld or hand-enclosed instrument; determining, by a processor (e.g., of the first device or the second device), a time-difference of arrival (TDOA) measurements (or phase-difference of arrival (PDoA)), or values derived therefrom, using the plurality of measured time measurements and the one or more measured phase measurements; and determining, by the processor, at least one localization measurement value of the ultra-wide band antenna of the handheld or hand-enclosed instrument based on the TDOA measurements (or phase-difference of arrival (PDoA)), or values derived therefrom; wherein at least the at least one localization measurement value or a parameter derived therefrom (e.g., position, speed, acceleration, or derived localization of the landmark on the instrument) is employed as one or more inputs, in a real-time control loop, to a software application that uses the handheld or hand-enclosed instrument as an input user interface.

In some embodiments, the method includes any of the operations for the above-discussed system.

BRIEF DESCRIPTION OF THE DRAWINGS

The skilled person in the art will understand that the drawings described below are for illustration purposes only.

FIGS. 7A-7L each shows example evaluation of the ITrackU system in the real-world indoor home environment in accordance with an illustrative embodiment.

DETAILED DESCRIPTION

Each and every feature described herein, and each and every combination of two or more of such features, is included within the scope of the present invention provided that the features included in such a combination are not mutually inconsistent.

Some references, which may include various patents, patent applications, and publications, are cited in a reference list and discussed in the disclosure provided herein. The citation and/or discussion of such references is provided merely to clarify the description of the present disclosure and is not an admission that any such reference is "prior art" to any aspects of the present disclosure described herein. In terms of notation, "[n]" corresponds to the $n^{th}$ reference in the list. All references cited and discussed in this specification are incorporated herein by reference in their entireties and to the same extent as if each reference was individually incorporated by reference.

Example System #1

Figure 1A:
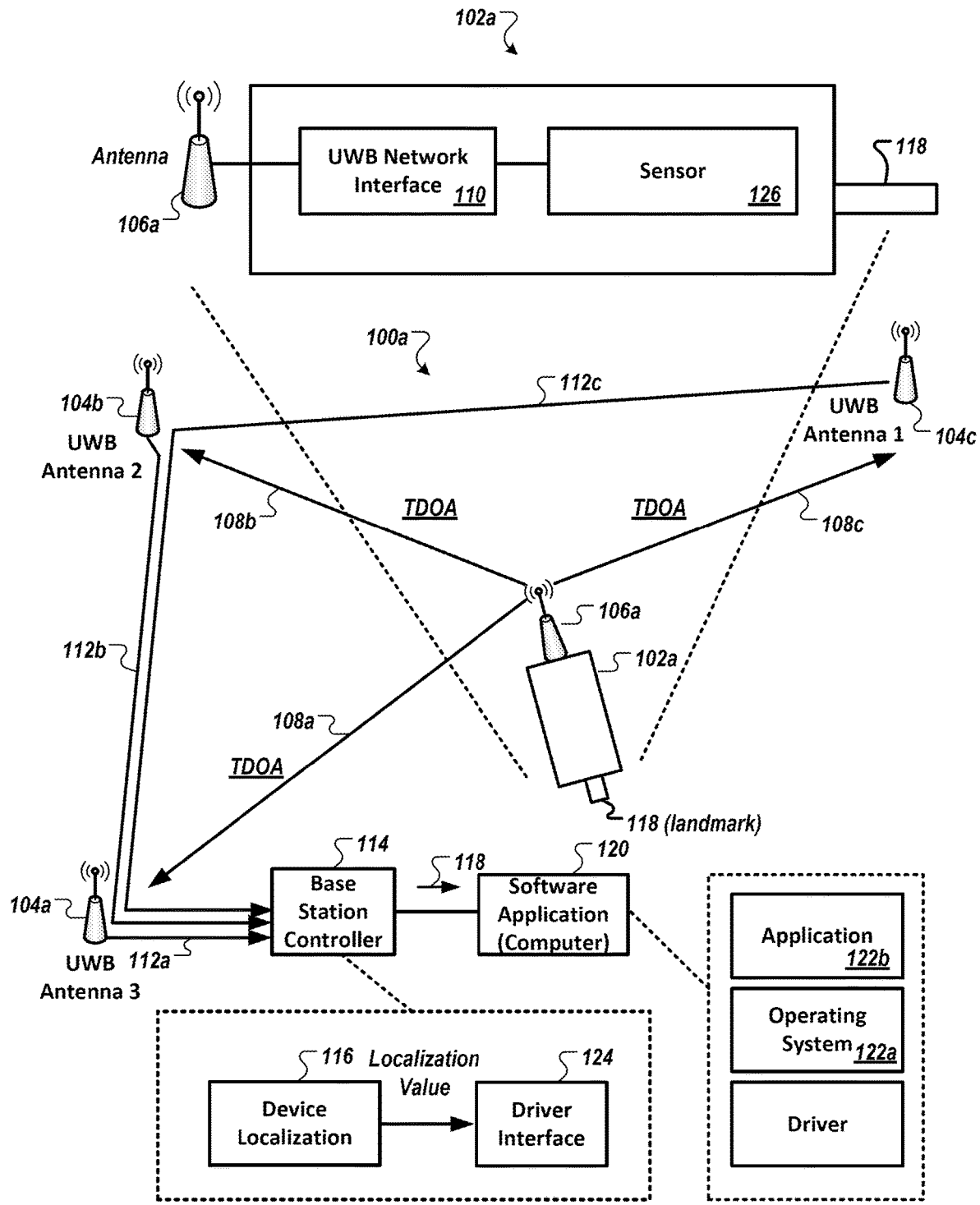
FIGS. 1A, 1B, and 1C each shows an example user-interface (UI) system comprising a handheld or hand-enclosed instrument configured with an ultra-wideband localization module that operates with a set of base stations in accordance with an illustrative embodiment.

FIG. 1A shows an example user-interface (UI) system 100 (shown as 100a) comprising a handheld or hand-enclosed instrument 102 (shown as 102a) configured with an ultra-wideband localization module that operates with a set of base stations 104 (shown as 104a, 104b, 104c) in accordance with an illustrative embodiment. In the example shown in FIG. 1A, the handheld or hand-enclosed instrument 102a is configured with a unidirectional UWB protocol to interface with set of base stations 104a-104c. The unidirectional UWB protocol can be employed for sub-millimeter localization using relatively inexpensive UWB wireless communication ICs and computing resources.

In FIG. 1A, the hand-associated instrument 102a includes an antenna 106 (shown as 106a) and a network interface 110. The network interface 110 operably connects to the antenna 106a, and, collectively, they are configured to transmit an UWB signal 108 (shown as 108a, 108b, 108c) as a set of RF pulses to the base stations 104a-104c. In the example shown in FIG. 1A, the UWB signal are continuously emitted from the antenna 106a and is received by the antennas 104a 104b 104c. The base stations 104a-104c are operatively connected via cables 112 (shown as 112a, 112b, 112c) to a multi-antenna receiver module 114 (shown as "Base Station Controller" 114) that can evaluate the signals at each respective base stations 104a-104c to determine the UWB signal's time-difference-of-arrival (TDoA) and phase measurements for each base station 104. The multi-antenna receiver module 114 may employ the time-difference-of-arrival and phase measurements to continuously determine, via a device localization operation 116, a localization measure for the antenna 106a as UI input 118 to a computer system 120 executing an operating system or a software application 122 (shown as 112a, 112b that uses the localization measure in part as an input user interface, in a real-time control loop, for a user (not shown) using the instrument 102. The device localization operation 116 may interface with a driver interface module 124 and/or other embedded or middle level software to interface In some embodiments, the cables 112a, 112b, and 112b may be bundled in a single cable assembly, though separately shielded. In other embodiments, the cables 112a, 112b, and 112b can be separate.

In some embodiments, the multi-antenna receiver module 114 provides the time-difference-of-arrival and phase measurements to the computer system 120, which then calculates the localization measure.

As used herein, the term "ultra-wide band (UWB)" refers to a low-energy level, short-range, high-bandwidth communication and associated frequency having a wide radio frequency spectrum greater than 500 MHz. UWB transmissions can transmit information by generating radio energy at specific time intervals and occupying a large bandwidth, e.g., for pulse position modulation or time modulation. The information can also be modulated on UWB signals (pulses) by encoding the polarity of the pulse, its amplitude and/or by using orthogonal pulses. UWB pulses can be sent sporadically at relatively low pulse rates to support time or position modulation but can also be sent at rates up to the inverse of the UWB pulse bandwidth. UWB pulses can typically be generated, e.g., between about 3.1 GHz and about 10.6 GHz, between about 3 GHz and about 10 GHz, between about 6 GHz and about 8 GHz, between about 6 GHz and about 8.5 GHz, between about 3.5 GHz and about 6.5 GHz, between about 6 GHz and about 9 GHz, between about 6 GHz and about 8.5 GHz, between about 6.2 GHz and about 8.3 GHZ, between about 6.2 GHz and about 7.8 GHz. In some embodiments, the frequency spectrum is greater than 8 GHz. Further examples of ultra-wide band (UWB) can include devices compliant with IEEE 802.15.3a, or those compliant with IEEE 802.15.4a or IEEE 802.15.4z. Embodiments herein can also be implemented with wireless HD, wireless FireWire, wireless USB, Bluetooth SIG, Wi-Fi (IEEE 802.11 family of protocols), among others, e.g., having pulse RF protocols.

Notably, the user-interface (UI) system 100 (e.g., 110a) can provide user input applications within a large work area or surfaces (e.g., 2D) or within a non-conforming workspace with reduced set of sensors. In some embodiments, the user-interface (UI) system 100 is employed in a wall or white board writing system. In other embodiments, the user-interface (UI) system 100 is employed in digital media and art application, e.g., as sculpting instrument. In yet other embodiments, the user-interface (UI) system 100 is employed as a hand-enclosed video game controller, e.g., glove. In yet other embodiments, the user-interface (UI) system 100 is employed in medical instrumentation applications, e.g., UI for remote surgical instrument. Additional configurations for these applications are further provided in FIGS. 1B and 1C which are later described herein.

Figure 1B:
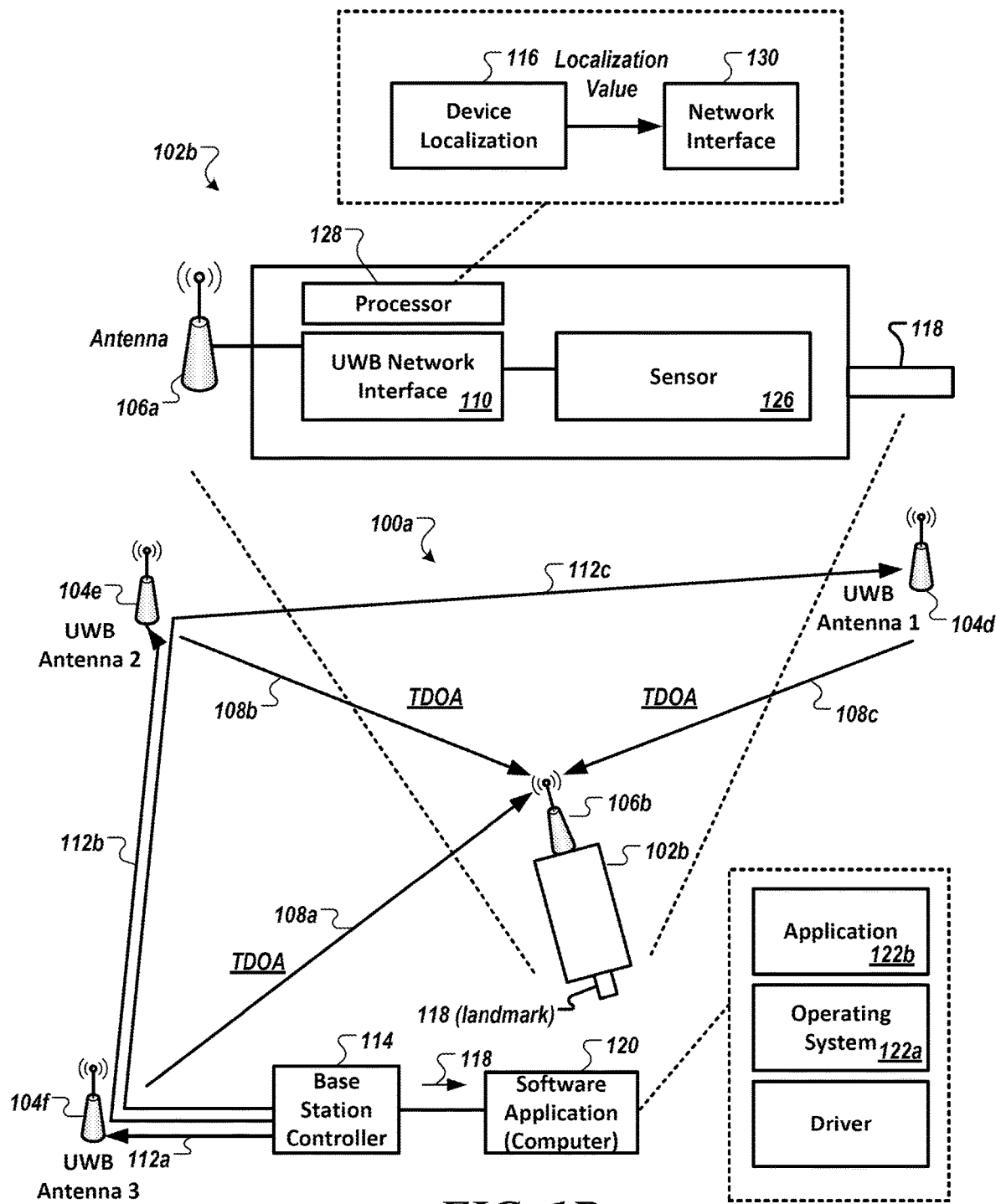
Figure 1C:
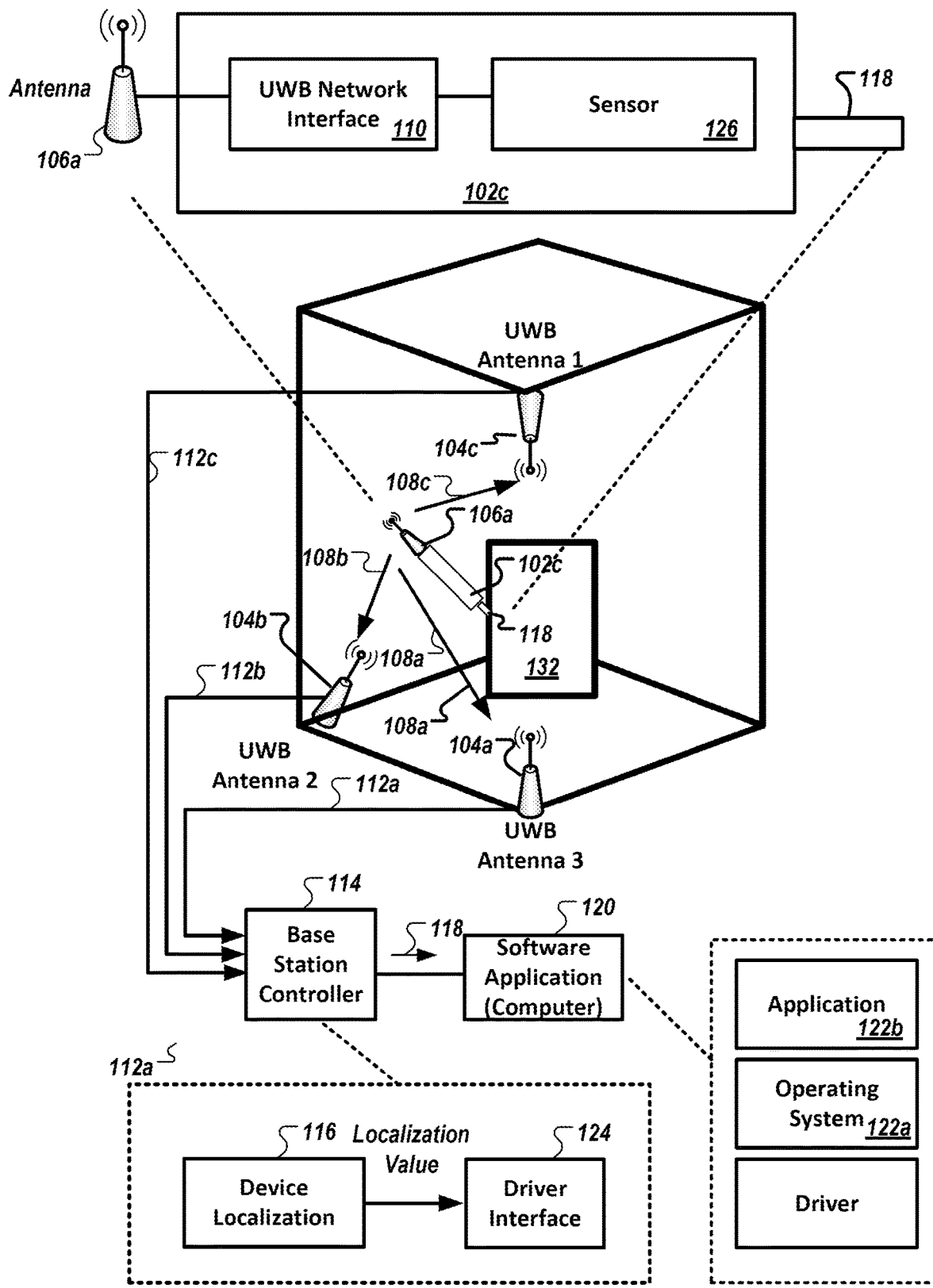
Figure 1D:
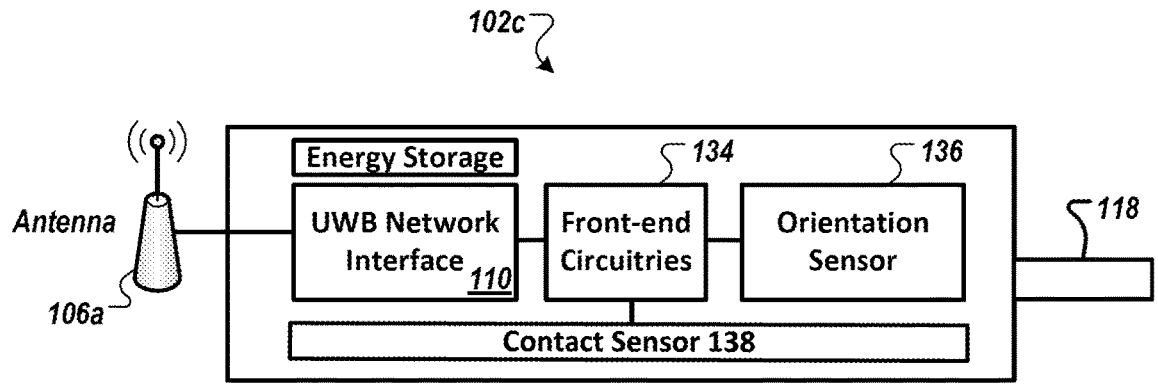
FIGS. 1D, 1E, and IF each shows an example hardware configuration of the handheld or hand enclosed instrument that can be employed in the system of FIG. 1A, 1B, or 1C in accordance with an illustrative embodiment.
Figure 1E:
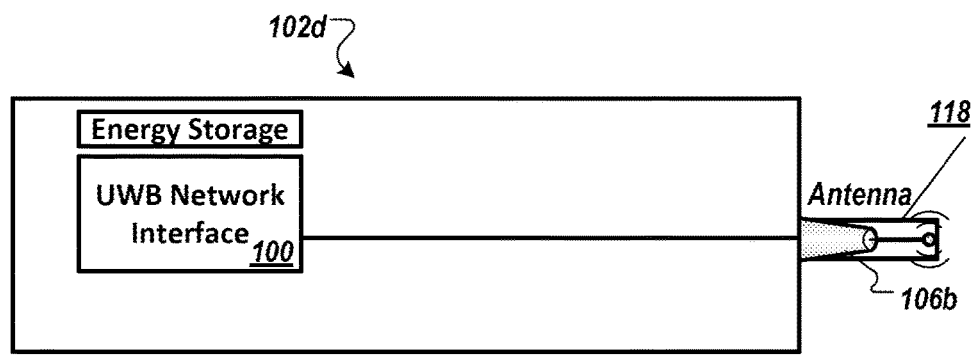

In some embodiments, e.g., as described in relation to FIG. 1E, the antenna (e.g., 106a) is located in the housing of the instruments at the landmark of interest 118, e.g., at the tip of the instrument (e.g., 102a). To this end, in this configuration, the user input for the tip of the instrument or other landmark of interest on the instrument can be determined solely from the location of the antenna 108.

Figure 1F:
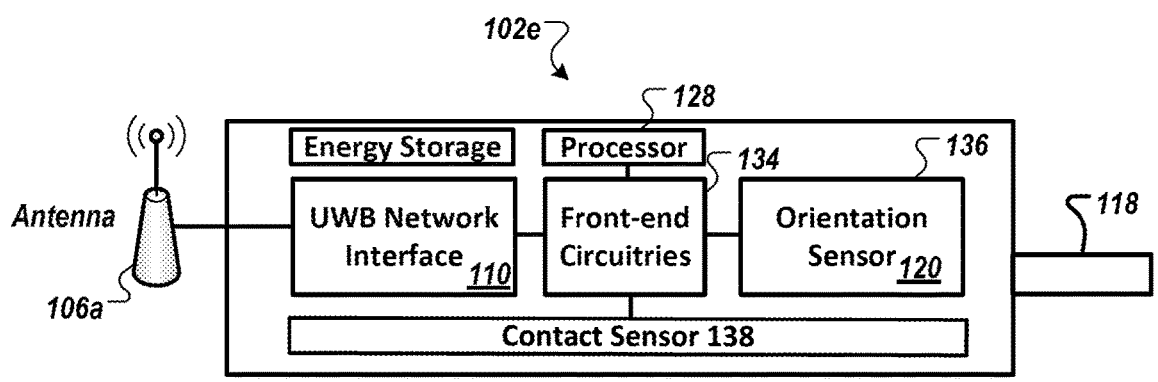

In other embodiments, e.g., described in relation in FIGS. 1D and 1F, the antenna 108 operates in combination with sensors 126 located in the instrument 102 to provide localization for the landmark 118 located on the instrument 102. In the example shown in FIG. 1A, the instrument 102a includes one or more orientation sensors 126 (further discussed herein) configured to provide orientation positioning of the instrument 102a.

Example Method of Operation—UWB Unidirectional-Message Protocol

To provide high or higher update rate for the UI interface and/or reduce or provide a low complexity processing and communication hardware, the handheld or hand-enclosed instrument 102 is configured to operate using unidirectional flow of messages/packets from the instrument network interface 110. Because a unidirectional flow of messages would consume less time as compared to that of a two-way message exchange protocol, a unidirectional protocol can provide high or higher update rates for the determination of the localization measure and thus the associated UI input. Unless stated otherwise, the term "messages" and "packets" are used interchangeably herein.

In alternative embodiments, the handheld or hand-enclosed instrument 102 is configured to use two-way message exchange between a device pair that can compensate for appropriate clock offset and clock drift. Example descriptions are provided in [4] and [22].

Figure 2A:
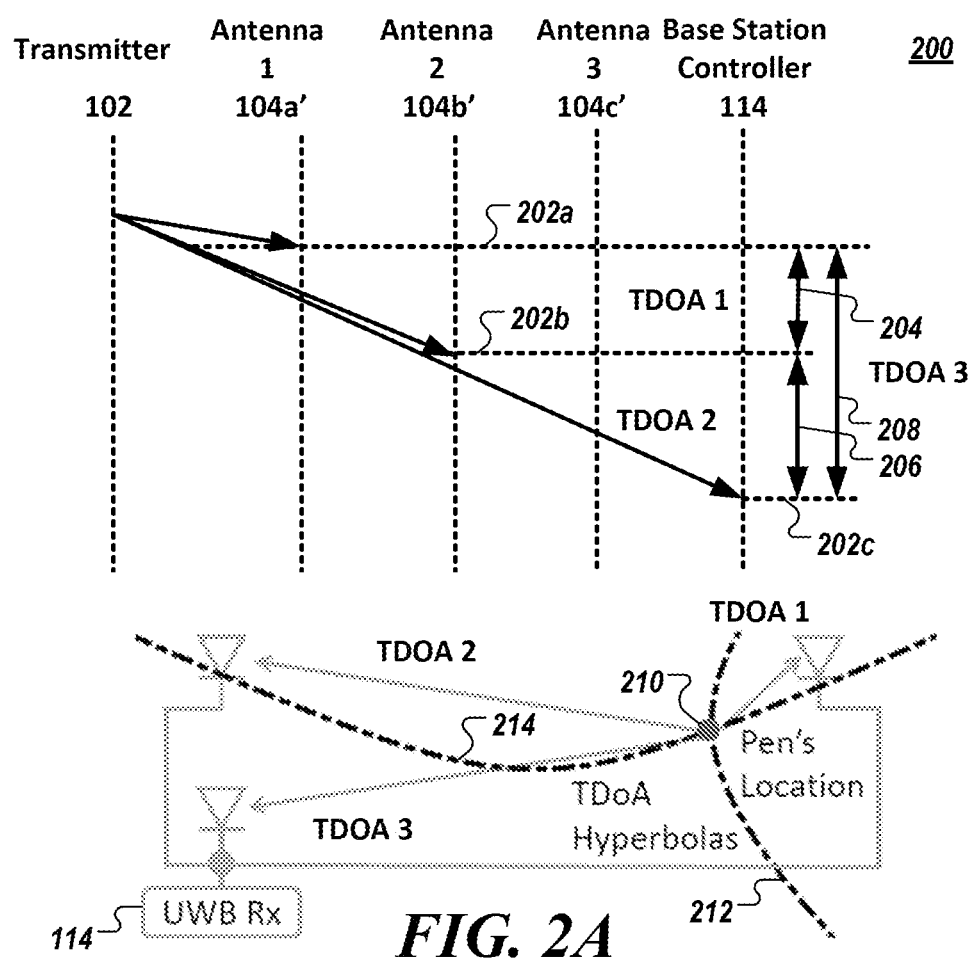
FIG. 2A shows an example method of an operation using an UWB unidirectional message protocol employed, e.g., in FIG. 1A, 1B, or 1C, in accordance with an illustrative embodiment.

FIG. 2A shows an example method 200 of an operation using an UWB unidirectional message protocol. In the example of FIG. 2, three or more receivers (shown as "Antenna 1" 104a', "Antenna 2" 104b', and "Antenna 3" 104c') are time-synchronized to each other and are configured to receive the same unidirectional message from the instrument 102a at three different time instances 202 (shown as 202a, 202b, and 202c). The messages are provided to a base station controller 114 (shown as "UWB Rx" 114) that can compute the time difference of arrivals (TDoAs) among the different antennas, including a first reverse TDOA value 204 between the first antenna 104a and the second antenna 104b, a second reverse TDOA value 206 between the second antenna 104b and the third antenna 104c, and a third reverse TDOA value 208 between the first antenna 104a and the third antenna 104c. To improve both the time difference of arrival (TDoA) and the phase difference of arrival (PDoA) determination, the antennas 104a' 104b', and 104c' can be connected by wires of different lengths to allow the received wireless signal to travel at different distances inside the wires before reaching the receiver/transmitter.

Additional examples of TDOA calculations are provided in [24], any of which may be employed herein. The three receivers 104 can be placed at three different locations, e.g., having different distances and associated cable length from one another. The base station 114 can be located at one of the three locations of the three receivers or at a fourth position.

In FIG. 2A, the base station controller 114 is configured to employ the TDoA measures (shown as 204a, 204b, 204c) among each antenna pair to estimate a hyperbola (shown as 212, 214) to which the hyperbolic locus 210 is the instrument location 210. That is, the base station controller 114 can calculate the intersection of three hyperbolas each obtained from the time-difference measure acquired between each pair of antennas to determine the source of the UWB signals located on the instrument 102. Each receiver antenna 104 may be connected to the base station controller 114 via a different RF cable length and power attenuator to ensure that each received UWB signal is time-separated for the obtained signal marker (e.g., CIR). Attenuators may be included for shorter length cables to compensate and normalize the power level among the different antennas.

For the hyperbola determination, the base station controller 114 may evaluate the air path differential (APD) of the UWB signals per Equation 1 and assume a constant time for the RF cable.

$$y(t) = \sum_k a_k(t) x(t - \tau_k) e^{-j2\pi f_c \tau_k} \quad \text{(Eq. 1)}$$

In Equation 1, the baseband demodulated received signal y(t) can include multiple attenuated ($a_k$) and delayed (x) copies of the transmitted signal x(t). Equation 1 can be expanded to include the per-antenna delay on the received signals as shown in Equation 2.

$$y(t) = x(t) e^{-j(2\pi f_c(c - \tau_{a,i} - \tau_{c,i}) + \phi_0)} \quad \text{(Eq. 2)}$$

In Equation 2, for the $i^{th}$ antenna, the total delay observed by the receiver, $\tau_i$, includes two components: the propagation delay in the RF cable ($\tau_c$, i), and that in air ($\tau_a$, i). The receiver's arbitrary phase offset $\phi_0$ is referenced at the time of the message reception. A delay implies that the wireless signal traveled an extra distance corresponding to that delay. For a signal with wavelength $\lambda$, a delay $\tau_i$ can correspond to $n_i$ integer wavelengths and a residual $\phi_i = 2\pi$ fraction of $\lambda$. In embodiments in which the signal marker (e.g., CIR) is a complex number, the phase may be extractable and used in the analysis, e.g., per Equation 3.

$$y_i(t) = x(t) e^{-j2\pi f_c \left( t - (n_{c,i} + \frac{\phi_{c,i}}{2\pi}) \frac{\lambda}{c} - (n_{a,i} + \frac{\phi_{a,i}}{2\pi}) \frac{\lambda}{c} + \phi_0 \right)} \quad \text{(Eq. 3)}$$

Equation 3 shows Equation 2 expanded to include the phase and integer wavelengths, in the cable (subscript c), and the air (a), where c is the speed of light. Equation 3 shows variability in extracting the APD, including (i) every packet can have an arbitrary phase $\phi_0$, and (ii) signal travelling through the cable's length can affect the air path. To address the above two variabilities, the system may employ a double differential operation. It can be first observed in Equation 3 that all antennas share identical phase offset $\phi_0$, thus the various antenna equations can be subtracted from each other and the $\phi_0$ term eliminated to provide the relative delay $D_{r,i}$ equations for antenna i and antenna 1 in Equation 4:

$$D_{r,i} = \frac{\lambda}{c}\left((n_{c,i} + \frac{\phi_{c,i}}{2\pi}) + (n_{a,i} + \frac{\partial_{a,i}}{2\pi})\right) - \frac{\lambda}{c}\left((n_{c,1} + \frac{\phi_{c,1}}{2\pi}) + (n_{a,1} + \frac{\phi_{a,1}}{2\pi})\right). \quad \text{(Eq. 4)}$$

It can then be observed that the cable-delay may remain constant over time for any antenna, thus, the differences among consecutive packets received over the same antenna and over the relative delays may cancel out the cable delay to provide Equation 5:

$$\Delta D_{r,i}^j = \frac{\lambda}{c}\left[\left(n_{a,i}^{j+1} + \frac{\phi_{a,i}^{j+1}}{2\pi}\right) - \left(n_{a,1}^{j+1} + \frac{\phi_{a,1}^{j+1}}{2\pi}\right)\right] - \frac{\lambda}{c}\left[\left(n_{a,i}^j + \frac{\phi_{a,i}^j}{2\pi}\right) - \left(n_{a,1}^j + \frac{\phi_{a,1}^j}{2\pi}\right)\right]. \quad \text{(Eq. 5)}$$

The difference in phases over time has only air-path terms which can map to the change in location of the instrument 102 (as the APD). It can be assumed that the distance of the transmitter from the $i^{th}$ antenna during UWB packet j is $d_i^j$, then the changes in the APD can be expressed as Equation 6:

$$\Delta APD = \left(d_i^{j+1} - d_1^{j+1}\right) - \left(d_i^j - d_1^j\right) = \Delta D_{r,i}^j. \quad \text{(Eq. 6)}$$

Figure 6A:
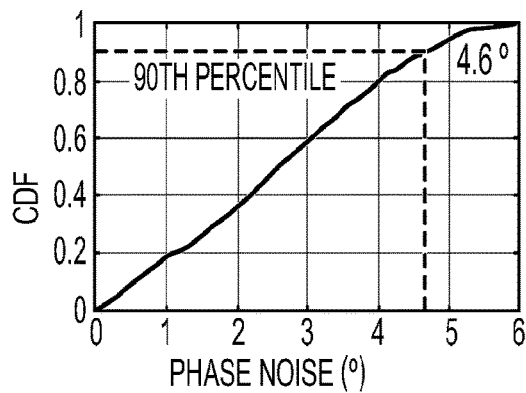
FIGS. 6A-6E each shows examples of device's benchtop performance of the ITrackU system of FIG. 5 in accordance with an illustrative embodiment.
Figure 6B:
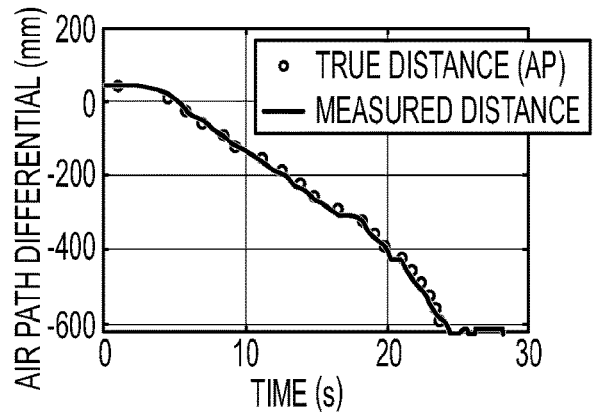
Figure 6C:
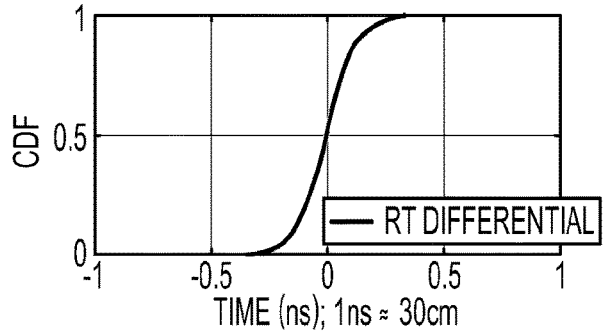
Figure 6D:
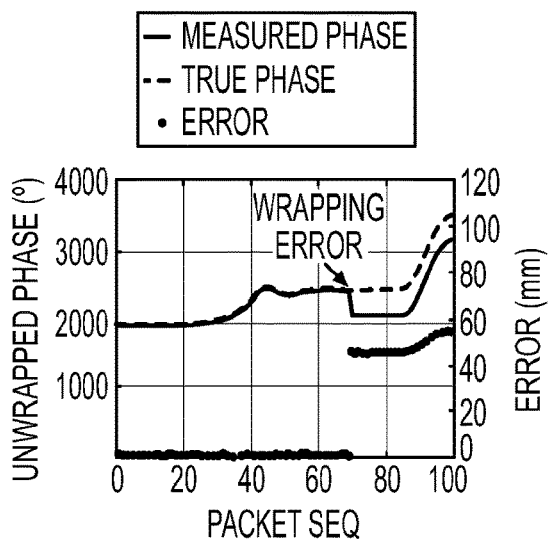
Figure 6E:
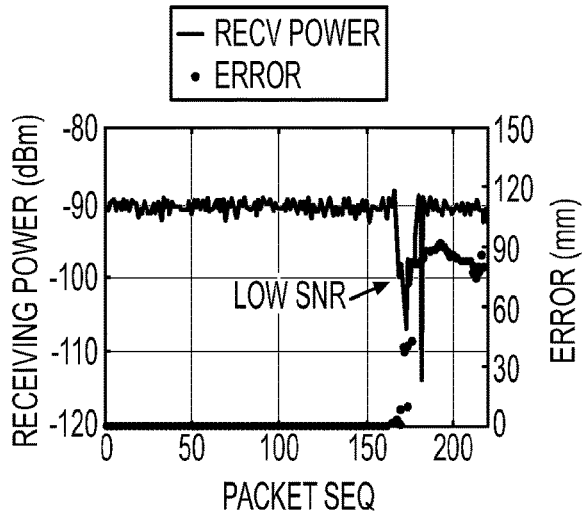

Additional simplification of $\Delta D_{r,i}^j$ when the relative movement between consecutive packets is within one wavelength to provide $n_{a,i}^{j+1} = n_{a,i}^j$ and the relative APD can be determined via the phase information only per Equation 7:

$$\Delta \phi_{r,i}^j = \phi_{r,i}^{j+1} - \phi_{r,i}^j \quad \text{(Eq. 7)}$$

where $\phi_{r,i}^j$ is the relative phase between antenna "1" and antenna "i" for the $j^{th}$ UWB packet. Equation (7) can be used as a mechanism to localize the instrument 102 in the system 100. Empirical data has been collected over 900+ independent UWB packets; the data showed that the $90^{th}$ percentile range of phase$^2$ is about 4.6°. FIG. 6A shows the relative phase of an ultrawideband signal. FIG. 6B shows evaluated true phase vs. measured phase at anchor points. For a UWB center frequency of 3.993 GHZ, the distance precision as the practical limit of the UI system 100 thus $$\frac{4.6}{360} \cdot \frac{3 \times 10^8}{3.993 \times 10^8} \cong 0.96 \text{ mm}.$$

If during consecutive UWB packets, the transmitter (i.e., 118) has moved more than one wavelength, then $n_{a,i}^{j+1} \neq n_{a,i}^j$ and Eq. (5) can produce a phase-wrap error, which can be corrected by inertial sensor fusion (e.g., from sensor 126).

Phase Extraction from Channel Impulse Response

Figure 2B:
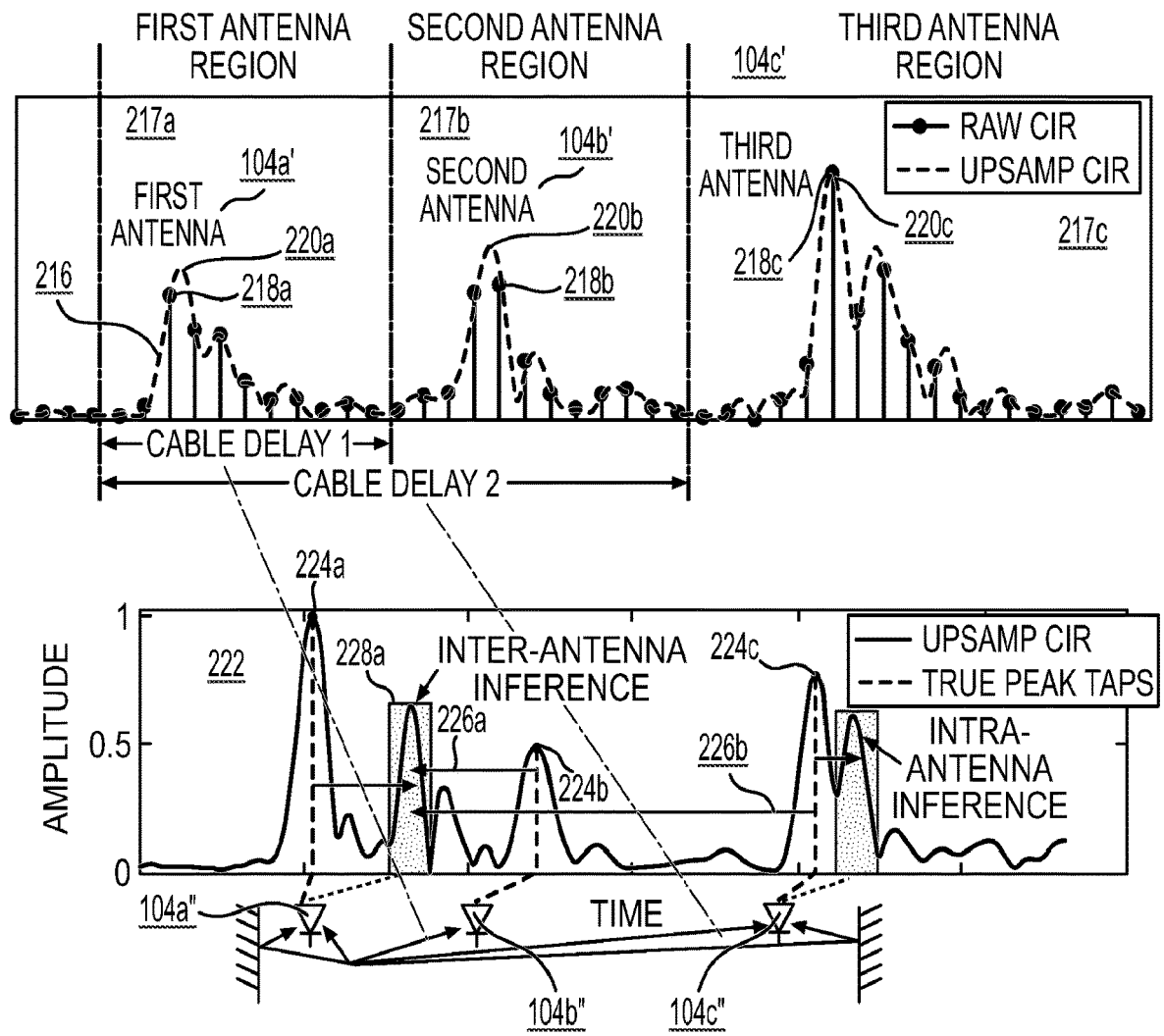
FIG. 2B shows method of extracting channel impulse response (CIR) from the set of transmitted UWB RF pulses in the UWB unidirectional message protocol of FIG. 2A in accordance with an illustrative embodiment.

FIG. 2B shows aspects of operation 200 in extracting channel impulse response (CIR) from the set of transmitted UWB RF pulses, e.g., by the UWB network interface 110.

Upsampling. Upsampling can be performed to improve the accuracy of localization. In FIG. 2B, an example UWB communication channel is shown that provides a raw CIR (216) that is sampled, e.g., every 1 ns (1 GHz sampling rate), that is received at three antennas that are spaced with differences of meters apart in length. Each sample 216 in a CIR may be referred to as a tap. In this example, the raw CIR taps are obtained at the receiver with three prominent pulses 218 (shown as 218a, 218b, 218c) corresponding to received signal over each antenna.

However, as can be observed in FIG. 2B, even with nanosecond resolution in time, the exact moment when the signal peaks can be missed as the true peak frequently can occur between two sampled taps. To improve accuracy and subsequently the localization resolution, the UWB network interface 110 can be configured to upsample the raw CIR or to interpolate the raw CIR. The interpolation allows the true or truer peak of the CIR to be determined between the sampled raw CIR.

In some embodiments, the UWB network interface 110 is configured to upsample or interpolate the raw CIR by 2×, 4×, 8×, 16×, 32×, 64×, among others. For a 64-time upsampling or interpolation operation, the CIR has a resolution of 64 GHz (i.e., 15.625 picoseconds duration between taps for a 1-GHz UWB signal). In some embodiments, the upsampling or interpolation is performed for a portion of the raw CIR signal segments, e.g., within a window centered around a detected peak. In some embodiments, the UWB network interface 110 is configured to identify the peak taps in each upsampled or interpolated CIR and track the phase. The time or sample number associated with the peak tap and determined phase can be subsequently provided the APD calculations, e.g., as described in relation to Equation 7.

Cable Delay. By connecting wires of different lengths or embedded with phase adjusting electronic component to allow the received wireless signal to travel at different distances between the receiving antenna and the base station controller, the time difference of arrival and the phase difference of arrival can be more readily determined in view of multi-path issues and local interferences, e.g., as shown in FIG. 2B. In some embodiments, the length of the cables (and/or phase adjusting electronic component) can be selected to be provide a delay, $T_{max}$, that is greater than the difference in delay between a direct signal path and a worse-case signal path due to multipath effects to provide distinct detection zones 117 (shown as 117a, 117b, and 117c) for the respective time or phase measurements of each of the antennas by the base station controller 114. The cables may further include, in some embodiments, pre-defined RF attenuators configured to adjust the amplitude to reduce the signal power received by earlier antennas ensuring the signal from a posterior antenna to have larger amplitude (e.g., for identification), or vice versa, e.g., as shown in FIG. 2B.

FIG. 2B also shows an example CIR (222) without cable delays in which inter-antenna interference and intra-antenna interference can impact the determination of time difference of arrival and the phase difference of arrival. Inter-antenna inference refers to the delayed environmental reflections of a prior antenna's signal that can confuse the selection of the subsequent antenna's signal. Intra-antenna inference refers to the peak in an impulse being polluted by nearby multipath received by the same antenna (an object close to the antenna). In an ideal model, in UWB communication, a set of RF pulses are transmitted and are received at the receiver, shown as peaks 224a, 224b, 224c. That is, the TDoA time or phase measure for each of the receiving antenna can be determined as the peak of the RF pulses received at the respective antenna 104 (shown as 104a", 104b", and 104c").

Because the accuracy of TDoA tracking can depend on the accurate peak-detection in each impulse, inter-antenna interference and intra-antenna interference can cause significant errors in phase measurements because artifact peaks 228 (shown as 228a, 228b) can be caused by one or a combination of the received peaks and mislabeled or misinterpreted by the tracking (the potential contribution from the real peaks to the artifact peaks are shown as 226a, 226b, 226c for the example of 228a). To this end, by spreading out the arrival of the peaks at each of the respective antenna by more than $T_{max}$, the risk of mislabeling or misinterpreting the peaks to be used for the time difference of arrival and the phase difference of arrival can be eliminated or reduced, thus improving the accuracy of the peak detection of the impulse and the localization performance of the system.

While techniques such as those described in Strata can reduce the search-space by filtering out the taps whose corresponding physical position lie outside the field, such techniques work only for small fields. For a system that can track a 2.5 m×2 m area, many locations can have ambiguous tap selections even after search space reduction in which multipath taps can occur anywhere in the CIR in a multipath-rich indoor environment. The localization data can be stored 100× less than that of comparable video data.

RF Attenuation. To further reduce or eliminate risk of mislabeling or misinterpreting the peaks (e.g., due to inter-antenna interference) to be used for the time difference of arrival and the phase difference of arrival, the exemplary localization system can employ both an architectural and an algorithmic approach for accurate tap selection that entail adjusting the RSS power received at each receiver, e.g., using appropriate RF attenuator and cable delay.

Because a multipath signal would arrive later than the true signal, it is likely to have much lower RSS. And, if a multipath signal arrives later than a certain time threshold Tmax after the direct path signal, the multipath signal is likely to have much lower RSS. These insights can be employed in the selection of the appropriate cable delay to ensure that the direct path impulses are separated by at least $T_{max}$. In addition, RF attenuators can be place at each antenna to limit the signal power received by earlier antennas ensuring the signal from a posterior antenna has larger amplitude. Thus, the multipath from the first antenna will always be weaker compared to the peak of the direct impulse of the second antenna, and so on. The true peak can be discriminated from a multipath tap by simple amplitude check.

Relative-Time Filtering and Calibration. To further eliminate errors due to intra-antenna interference, relative-time filtering and calibration may be employed. Because interfered signals are received by the same antenna during intra-antenna interference, intra-antenna interference may not be solved solely by use of RF attenuation or cable delay. The filtering can exploit the observation that the relative time (RT) of peak taps can change little in two adjacent UWB packets (e.g., if the peak tap of the first impulse is $t_1$ and the peak tap of the second impulse is $t_2$, their relative time is $t_2 - t_1$).

Figure 4A:
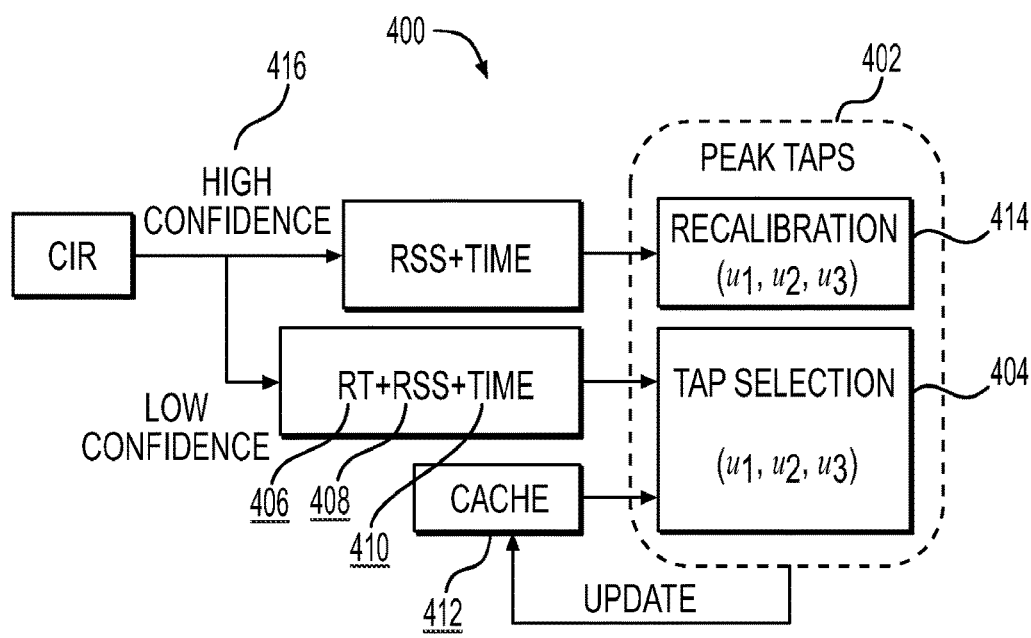
FIG. 4A shows a diagram of a tap selection pipeline operation 400 that employs relative-time filtering and calibration in accordance with an illustrative embodiment.

FIG. 4A shows diagram of a tap selection pipeline operation 400 that employs relative-time filtering and calibration. In the example shown in FIG. 4A, the pipeline operation 400 is configured to determine (402) the peak taps in a CIR by selecting tap, via tap selection operation 404, using relative time information 406, signal strength information (RSS) 408, and time measurement 410 by evaluating the 3-tuples (relative time information, RSS, and Time measurement shown as $u_1$, $u_2$, and $u_3$) to determine which satisfies a timing requirement per Equation 8 and selecting the one with a largest amplitude and smaller timestamp. In some embodiments, the pipeline operation 400 is configured to identify or extract all peaks in a CIR and filter out low-amplitude peaks. From the remaining high-amplitude peaks, the pipeline operation 400 is configured to compare the RT of each peak in a CIR with the RT of peak taps cached, in cache 412, from a previous packet.

$$(t_i + \tau - \Delta\tau, ti + \tau + \Delta\tau) \qquad \text{(Eq. 8)}$$

In Equation 8, $t_i$ is the $i^{th}$ peak, $\tau$ is the relative time, and $\Delta\tau$ is the relative time (RT) differential. Because using RT differential for tap selection may propagate errors, error in the peak tap selection in one CIR can influence the peak tap determination of next CIR. To prevent the error from accumulating, the pipeline operation 400 is configured to re-calibrate or reset, via the recalibration operation 414, the RT when it identifies (416) a high-confidence CIR, e.g., a CIR in which peak taps are clean and prominent.

FIG. 6A shows relative time differentials recorded between adjacent packets when the transmitter is moved a normal writing speed. It can be observed from FIG. 6A that the RT differentials can be limited in ±0.5 ns. In contrast, the multipath tap is typically separated from the direct path tap by at least 2 ns. Therefore, if RT in a CIR packet is $\tau$, and the first peak tap of the next CIR is $t_1$, then taps would only have to be searched lying in the range of $(t_1+\tau-0.5, t_1+\tau+0.5)$ ns.

Example Method of Operation—Integrated UWB Unidirectional-Message Protocol and Inertia Measurement Unit Instrument Landmark Determination. As noted above, the TDoA processing can operate in combination with orientation sensors located in the instrument 102 to provide localization for the landmark 118 located on the instrument 102. A rotation matrix $R_{l \to g}$ can be generated based on the measured orientation by the IMU and can be applied to (i) the localization measure for the antenna 106a of the instrument 102a and (ii) a pre-defined transform, to determine a second localization for the landmark 118 (e.g., tip) of the instrument 102a. To this end, the tip of the marker o the fingertip of a glove, or any landmark of interest can be determined based on the initial localization measure to the instrument antenna 106a and the orientation measure from the orientation sensor 216. The transform can be a three-dimensional vector that define the unit distances, in a local frame of reference, from the antenna 106a to the landmark 118. The rotation matrix provides a global frame of reference that can be applied to the transform to map the localization measure to the antenna 106a to the landmark 118.

Localization Error Drift Correction. In addition to being used to determine the second localization for the landmark 118, the measured orientation can be further used to improve the robustness of the localization accuracy by reducing or eliminating errors from phase wrapping and occlusions. Because of multipaths between the receiver antennas 104a 104b 104c and the antenna 106a, and because of partially/completely blocked or occluded, the strength of the UWB signal received can be degraded, resulting in degradation of the device localization and/or landmark localization. While the orientation sensors are themselves subjected to drift issues, the localization information and IMU information can fused via a fusion operation to recalibrate or eliminate the drifts in each respective sensor. Orientation sensors such as inertial sensors (e.g., in an inertial measurement unit) can provide measures of acceleration, angular velocity, and magnetic field. The orientation sensor 126 can be used to determine the acceleration of the instrument, and the acceleration can be used to determine when the device is moved, and to estimate how far the device is moved. This information can be fused with the UWB localization information to generate a more accurate localization estimates for the instrument 102.

Figure 4B:
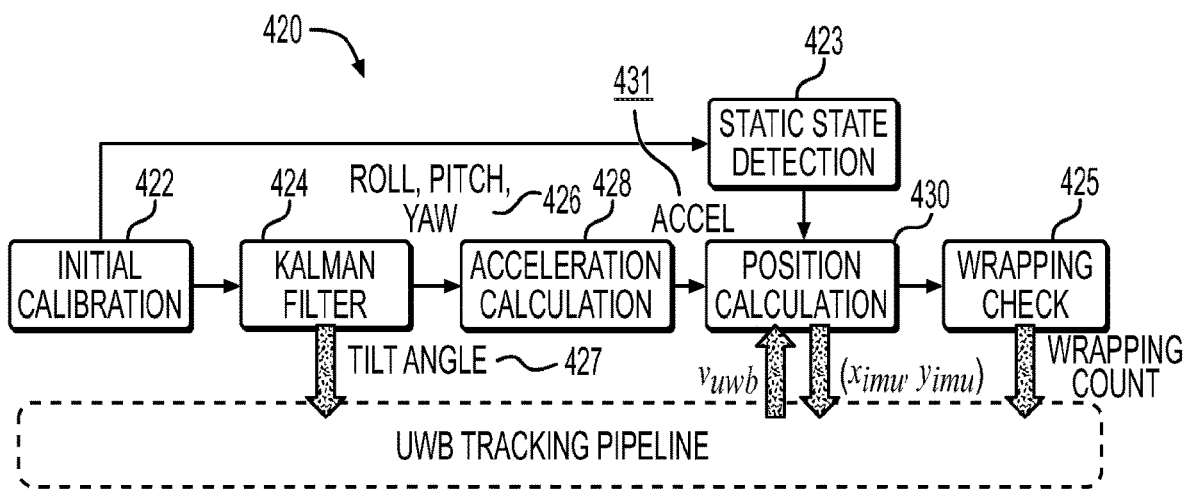
FIG. 4B shows a method of performing fusion tracking using the UWB localization measure and the inertial measurement unit measure, in accordance with an illustrative embodiment.
Figure 4B:
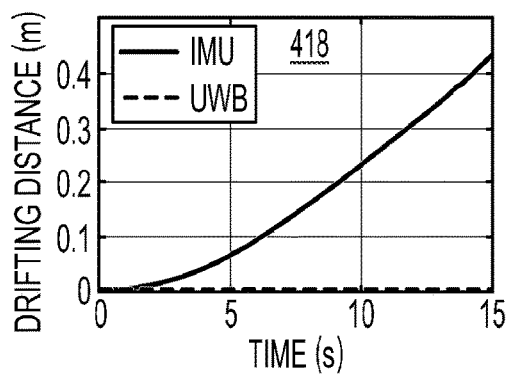
Figure 4B:
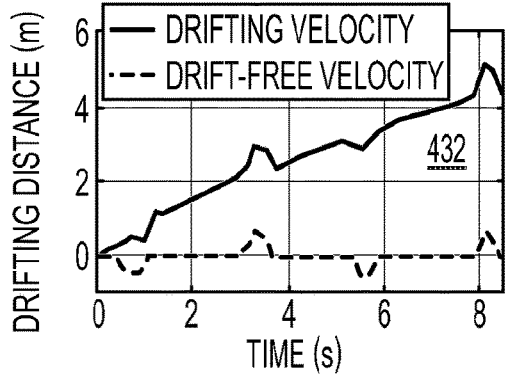

Integrated Fusion Tracking Operation. FIG. 4B shows a method of performing fusion tracking using the UWB localization measure and the inertial measurement unit measure, according to an illustrative embodiment. UWB localization and IMU measurements are complementary to one another. While UWB can provide high precision phase-based tracking, it is subjected to phase wrapping errors, while IMU as an independent sensor can capture the effects of movements on its inertial frame of reference at high-precision in sub-second scale. This independence allows UWB localization and IMU measurements to compliment each other.

Table 1 provides a list of benefits between UWB and IMU in a tracking task.

TABLE 1

| Attribute | UWB | IMU |
| --- | --- | --- |
| Sensors Needed | TX-RX pair (2) | 1 |
| RF Occlusion | High impact | Almost no effect |
| Sample rate | 20 Hz~100 Hz | ~200 Hz |
| Precision | <1 cm (ITrackU) | t < 1 s: 90% 0~3 cm |
|  |  | t ≥ 1 s: Drifting error |

Unlike UWB, IMU is a standalone sensor that does not need a transmitter-receiver pair to work. This property provides independence from wireless interference and blocking. However, despite wide use of IMUs in localization [17, 25, 38, 56], applying IMU in high-precision tracking tasks can nevertheless be challenging to provide a stable low-error position measurement over a long period due to its inherent operation. An IMU can provide a measure of linear acceleration in the global frame of reference (GRF) from a 9-degrees of freedom inertial and magnetic sensor (e.g., comprising 3-axis accelerometer, 3-axis gyroscope, and 3-axis magnetometer) and perform double integration to obtain the distance an object has moved per the motion equation, $d=v_0 t+at^2$. This double integration of acceleration can drift over time because when the moving duration t is less than 1 s, the square operation weakens the effect of drifting, yielding high precision over a short time. However, the same squaring operation would amplify the drift error over a longer duration. Because wrapping errors and signal blocking error typically occur in substantially less than 1 s, IMU can be used to mitigate such errors while UWB localization can be used to address IMU long term drifts. FIG. 4B shows a plot 418 of example IMU data (uncompensated) and UWB localization measurement collected for 30 seconds.

FIG. 4B shows example configuration of an integrated fusion tracking operation 420 using IMU and UWB localization data. In the example shown in FIG. 4B, the integrated fusion tracking operation 420 first perform an initial calibration 422 on the IMU sensor to remove offsets and biases. Because the acceleration data after calibration is measured in the local frame of reference (LRF), the integrated fusion tracking operation 420 is configured with a Kalman filter 424 to infer, from the 9DoF sensor data, the rotation data, roll, pitch, yaw (426) from the local reference frame (LRF) to the global reference frame (GRF). To avoid potential gimbal lock problem [23], the integrated fusion tracking operation 420 may employ a rotation matrix $R_{l \to g}$ (rather than Euler angles) to represent the mapping from LRF to GRF.

In addition to obtaining the acceleration vector ag in GRF, the rotation matrix $R_{l \to g}$ can also provide the tilt angle which can be used to compensate for projection offsets of the sensor. To reduce or eliminate drift error in the acceleration vector ag as discussed above, the integrated fusion tracking operation 420 can employ a two-fold recalibration operation on the motion data per a static state detection operation 423 and a phase wrapping detection operation 425. The static state detection operation 23 can when the IMU is static. The phase wrapping detection operation 425 can be used to detect the movements generated from UWB tracking. After recalibration (via 423, 425), the position from the IMU data may be determined and then fused into the UWB tracking to improve the overall performance.

Initial calibration (422) can involve the independent calibration of acceleration $a_{raw}$, gyroscope data $\omega_{raw}$ and magnetometer data $m_{raw}$. For accelerometer and gyroscope, biases can be introduced by sensor imperfections, while for magnetometers, external magnetic objects cause hard iron and soft iron distortion [21]. The calibration operation 422 can apply a linear fitting and zero-mean function to remove the initial offset and store the values for subsequent use. In some embodiments, a standard 10-parameter calibration on the magnetometer [2] can be employed. The calibration outputs, $a_l$, $w_l$, $m_l$ can be provided as inputs to the Kalman filter 424 and static state detection 422.

Rotation calculation, via Kalman-filter 424, can be determine, from the 9DoF calibrated IMU data in LRF, using two independent streams to calculate the rotation matrix Rl→g. The first stream may use the global gravity vector $g_0$ and magnetic vector $m_0$ as anchors. For a static object at time t, the acceleration vector $a_g$, can be determined per Equation 9.

$$a_g = R_{l \to g} a_l(t) = g_0, \; m_g = R_{l \to g} m_l(t) = m_0 \qquad \text{(Eq. 9)}$$

where the global gravity vector $g_0$ (pointing downwards) and the geomagnetic vector $m_0$ (approximately pointing north and downwards) are known. This first stream has no drift but is prone to error from movements and indoor magnetic noise. The second stream directly accumulates the calibrated gyroscope data $\omega_l$ to obtain the rotation. While it is not affected by linear acceleration (movements) and magnetic noise, it can drift over time. The Kalman filter can strike a good trade-off between these two streams [31, 59] to smooth the error through a weighted average operation of the outputs from the above two streams, and adaptively tune the weight based on the error feedback of each sensor. For instance, if the error of gravity $e_g = \|a_l\| - \|g_0\|$ increases, the weight of accelerometer will decrease correspondingly. The tuning can be repeated in every measurements or a portion thereof to improve the rotation calculation consistently. In addition to being employed in the acceleration vector $a_g$ calculation, the rotation matrix $R_l \to g$ can also be used to generate the IMU tilt angle 427 and remove the tracking offset caused by the distance gap between the RF transmitter and the instrument landmark 118 (e.g., tip).

Acceleration in GRF: The acceleration calculation operation 428 can use the rotation matrix $R_l \to g$ to map the local acceleration back to global reference frame (GRF) and then the gravity vector $g_0$ can be removed to obtain the clean linear acceleration 431 in GRF:

$$GRF a_g^{lin} = R_{l \to g}(t) a_l(t) - g_0.$$

Position in GRF: While the IMU data has already been calibrated at this time, integrating $a_g^{lin}$ to obtain a position value directly can still can incur drift resulting from the double integration. To remove the drift, the position calculation operation 430 can apply a sliding window when the time spans is less than 1 s, which can mitigate the drift of the second term (squared) in $d = v_0 t + a t^2/2$ though the drift in the first term $v_0 t$ may remain. The position calculation operation 430 may employ a 2-phase operation comprising a filter-and-reset to address the drift in $v_0 t$. In the filter phase, a high pass filter can be applied on $a_g^{lin}$ to remove drift. The cutoff frequency can be set to $0.2 f_s$, where $f_s$ is the IMU sampling rate. The reset operation can then completely eliminated the drift by setting the velocity vector $v_0$ to (0, 0, 0) either (i) when the object is stationary or (ii) when there is a high confidence UWB CIR (4160. Based on the first condition (i.e., object is stationary), the reset operation can make stationary-state inference by monitoring ($|a_l| - |g_0|$) and $|\omega_l|$, which should be "0" when the object is stationary. Based on the second condition (when the UWB signal has high confidence), the reset operation can use the position provided by the high-confidence UWB signal to determine a reference initial velocity: $v'_0(t) = d/dt$ (pos $(t + \Delta t) - $pos $(t)$). Since the reference velocity $v'_0(t)$ can be not affected by IMU drift, the initial velocity remains accurate for movement calculation. The reset operation can used the two conditions together for sample-wise velocity correction. Plot 432 in FIG. 4B shows the velocity before and after drift removal. By applying the filter-and-reset scheme, the position error in a t=1 s sliding window can be reduced from 1 m to <3 cm and be reduced to sub-centimeter when t<0.3 s.

Phase Wrapping Correction. Fusion of UWB localization data with IMU data can address the wrapping error by estimating the APD between two packets with IMU data. Wrapping error can occur when the APD between two successive packets exceeds $\lambda/2$. UWB CIR can be incorrect about the count of integer wraps while still providing accurate phase measurement. IMU data can fill this gap. For instance, when the APD is determined from the IMU data to lie between [$\lambda/2$, $3\lambda/2$], the count of the phase wrapping cycle can be increased by "1." The wrapping check 425 can be performed, e.g., for every UWB packet. With the correct wrapping cycle estimation, together with high precision tracking using phase, the accuracy can be retained similar to the no integer ambiguity case.

Occlusion Correction. Fusion of UWB localization data with IMU data can also address short-lived low-quality CIR caused by temporary occlusion events. A UWB-only tracking scheme can experience accuracy degradation during, or after, short-lived low-quality CIR occlusion events. The IMU data can use the IMU for positioning during a detected occlusion event. By using the positioning data from the IMU during the occlusion event, the UWB localization can achieve <3 cm errors for about 1 s. And, once the UWB signal quality recovers, the UWB localization can again take over without having accumulated any error propagation.

Example Systems #2 and #3

In FIG. 1A, the instrument 102 is configured as a transmitter and the base stations 104 are configured as receivers that provide signals received from the instrument 102 to a controller 106 (shown as "Base Station Controller" 106).

FIG. 1B shows an alternative embodiment in which the handheld or hand-enclosed instrument 102 (shown as 102b) is configured as a receiver and the base stations 104 are configured as transmitters to provide signals to the instrument 102 for it to calculate its localization position. FIG. 1C shows yet another alternative configuration in which the base stations 104 is configured for localization operation in full 3D environment. In FIGS. 1A and 1B, the localization is shown with respect to a two-dimensional plane, e.g., for a 2D writing surface.

Specifically, in FIG. 1B, the instrument 102b further include a processor 128 configured to execute the device localization operation 116 as described in relation to FIG. 1A. The determined localization of the instrument 102b can be transmitted to the base station controller 114 through a network interface 130 to provide the computer system 120.

In FIG. 1C, the antennas 104 (shown as 104d, 104e, 104f) may be deployed in a three-dimensional workspace to provide localization with the instrument 102 (shown as 102c). In the example shown in FIG. 1C, the instrument 102c can moved with respect to a workpiece 132. The workpiece can be an object, a surface, or a material such as three-dimensional surfaces. Non-limiting examples of three-dimensional subjects 170 can include a block of wood, stone, plastic, or metal that is being sculpted.

The instrument 102c can be any handheld instrument or tool such as a pens, pencils, markers, brushes, chisels, surgical scalpels.

The instrument 102c can also be a wearable device such as a glove, a hat, shoes, glasses, or any article of clothing.

Example Handheld or Hand Enclosed Instrument

FIGS. 1D, 1E, and 1F each shows an example handheld or hand enclosed instrument 102 (shown as 102d, 102e, 102f) that can be employed in the system of FIG. 1A, 1B, or 1C in accordance with an illustrative embodiment.

In the example shown in FIG. 1D, the instrument 102c includes an antenna 106 (shown as 106a) and a UWB network interface 110. The UWB network interface 110 operably connects to the antenna 106a, and, collectively, they are configured to transmit an UWB signal 108 as a set of RF pulses to the base stations 104a-104c. In the example shown in FIG. 1D, the UWB network interface 110 is connected to front-end circuitries 134 that can include preamplifier and conversion mix-circuitries, and/or serial communication bus interfaces, to interface with orientation sensors 136 and contact sensors 138. In some embodiments, the orientation sensors include a 9DoF IMU unit configured to provide 3-axis accelerometer, 3-axis gyroscope, and 3-axis magnetometer. Other IMU configurations having discrete accelerometer, gyroscope, magnetometer components or IC may be employed.

Contact sensor 138, in some embodiments, includes an embedded pressure sensor positioned on and/or along a surface of the instrument body 138 to be held by a user to provide a measure of real-time pressure change as well as angle relative to the reference frame of the writing plane. The pressure sensor is configured to sense a person's grip on the instrument body 138 as a mechanism to determine when contact is made with a surface. The contact sensor 138 may operate with a pressure-threshold check.

The contact sensor 132 can be any sensor able to determine when a part of the instrument is contacted. This can include sensors configured to measure pressure, as well as sensors configured to measure distance or light. Non-limiting examples of contact sensors 138 include force sensitive resistor, pressure sensors, laser rangefinders, and photodiodes.

Figure 2C:
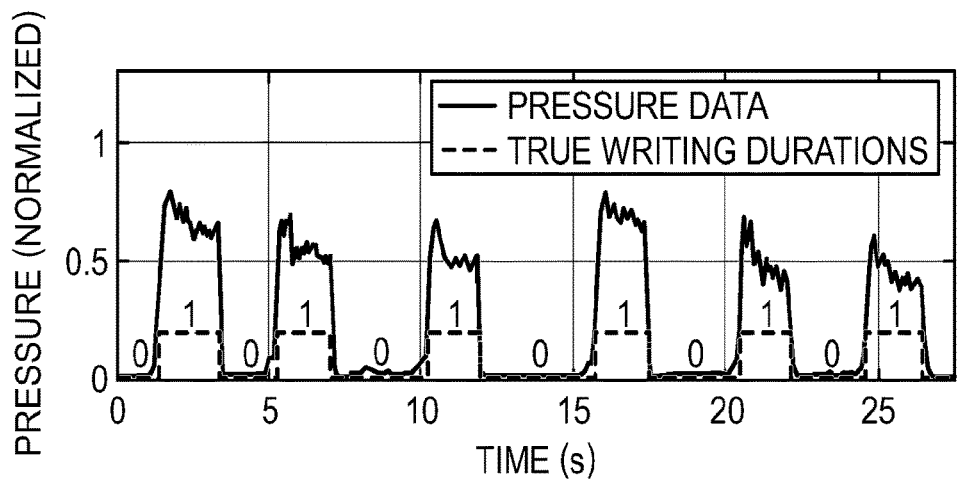
FIG. 2C shows a plot showing operation a described operation to provide contact output using pressure sensors in accordance with an illustrative embodiment.

FIG. 2C shows a plot of observed correlation between the pressure data and the touch-screen's output. This correlation is generic to be applied to most contact scenarios as there are natural biological feedback for a person to apply additional pressure on a handheld object or instrument to overcome the friction of the surface when writing. It can also be observed that elevated pressure is naturally relieved when the friction (i.e., contact) is absent as the user lifts an handheld instrument from a writing surface.

FIG. 1E shows another configuration of a handheld or hand enclosed instrument 102 (shown as 102d) in accordance with an illustrative embodiment. In the example shown in FIG. 1E, the antenna 106 (e.g., 106b) is located in the housing of the instruments at the landmark of interest 118, e.g., at the tip of the instrument (e.g., 102a). To this end, in this configuration, the user input for the tip of the instrument or other landmark of interest on the instrument can be determined solely from the location of the antenna 108.

FIG. 1F shows another configuration of a handheld or hand enclosed instrument 102 (shown as 102e) in accordance with an illustrative embodiment. In the example shown in FIG. 1F, the device of FIG. 1D is further configured with a processor 128. The instrument 102e can be configured for use as a receiver and includes processing resources to determine the localization of the instrument 102e. The instrument 102e can then provide that localization determination, e.g., via the network interface 110, or a separate network interface (not shown), to a computer system 120, a described in relation to FIG. 1B.

Example UI Processing and UI Interface

FIGS. 3A-3D each illustrates example UI processing operations that can be performed by the base station controller (e.g., 114), e.g., as described in relation to FIG. 1A or 1C or by the instrument (e.g., 102b), e.g., as described in relation to FIG. 1B and generate via that operation inputs to the computer system 120.

Figure 3A:
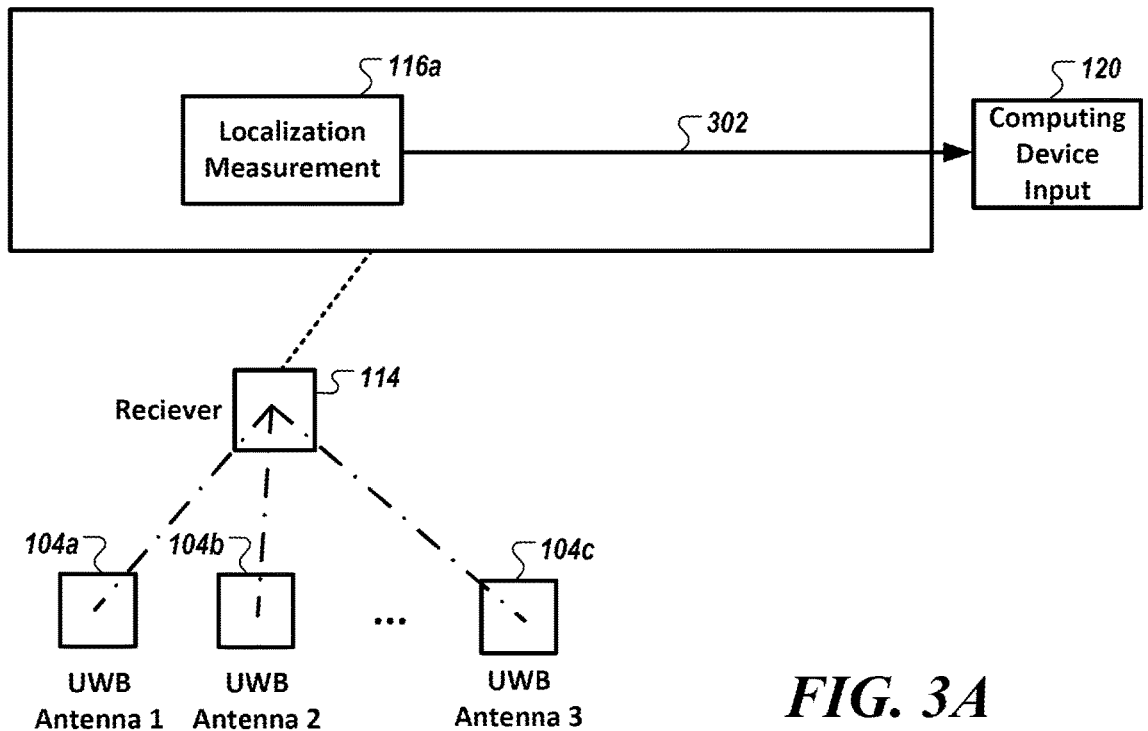
FIGS. 3A-3D each illustrates example UI processing operations that can be performed by the base station controller, e.g., as described in relation to FIG. 1A or 1C, or by the instrument, e.g., as described in relation to FIG. 1B and generate via that operation inputs to the computer system in accordance with an illustrative embodiment.

In the example shown in FIG. 3A, the base station receiver 114 receives a plurality of time measurements and one or more phase measurements (as a TDoA and/or PDoA measure) from a plurality of antennas 104a, 104b, 104c to determine, via a localization measurement operation 116a, a localization measurement value 302. The localization measurement value 302 can be provided as an input to a computer 120.

Figure 3B:
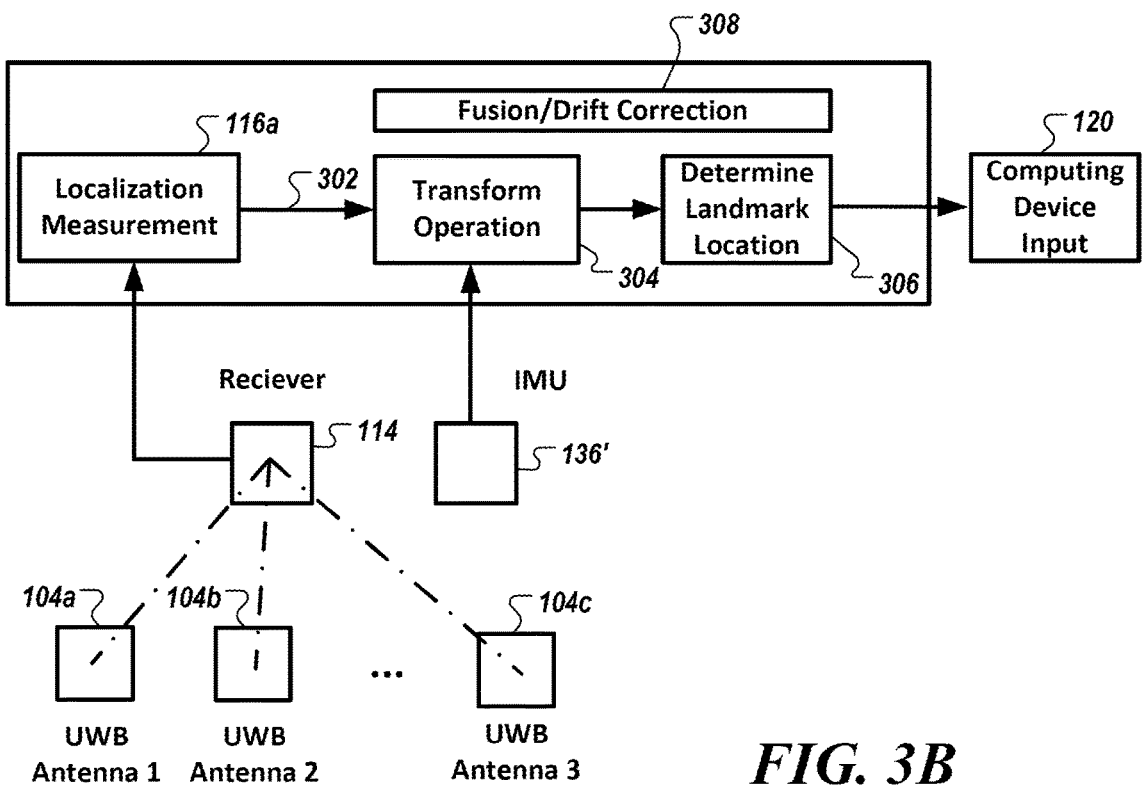

In the example shown in FIG. 3B, the base station receiver 114 receives a plurality of time measurements and one or more phase measurements (as a TDoA and/or PDoA measure) from a plurality of antennas 104a, 104b, 104c to determine, via a localization measurement operation 116a, a localization measurement value 302. The base station receiver 114 further receives orientation data from IMU 136' and use the orientation data to determine, via a transform operation 304, a second landmark localization 306 corresponding to the landmark 118 of interest and provide the second landmark localization 306 as input to a computer device 120. The base station receiver 114 can perform a fusion operation 308 of the UWB localization data and IMU data as described, e.g., in relation to FIGS. 4A and 4B to address phase wrapping, occlusion, and drift issues.

Figure 3C:
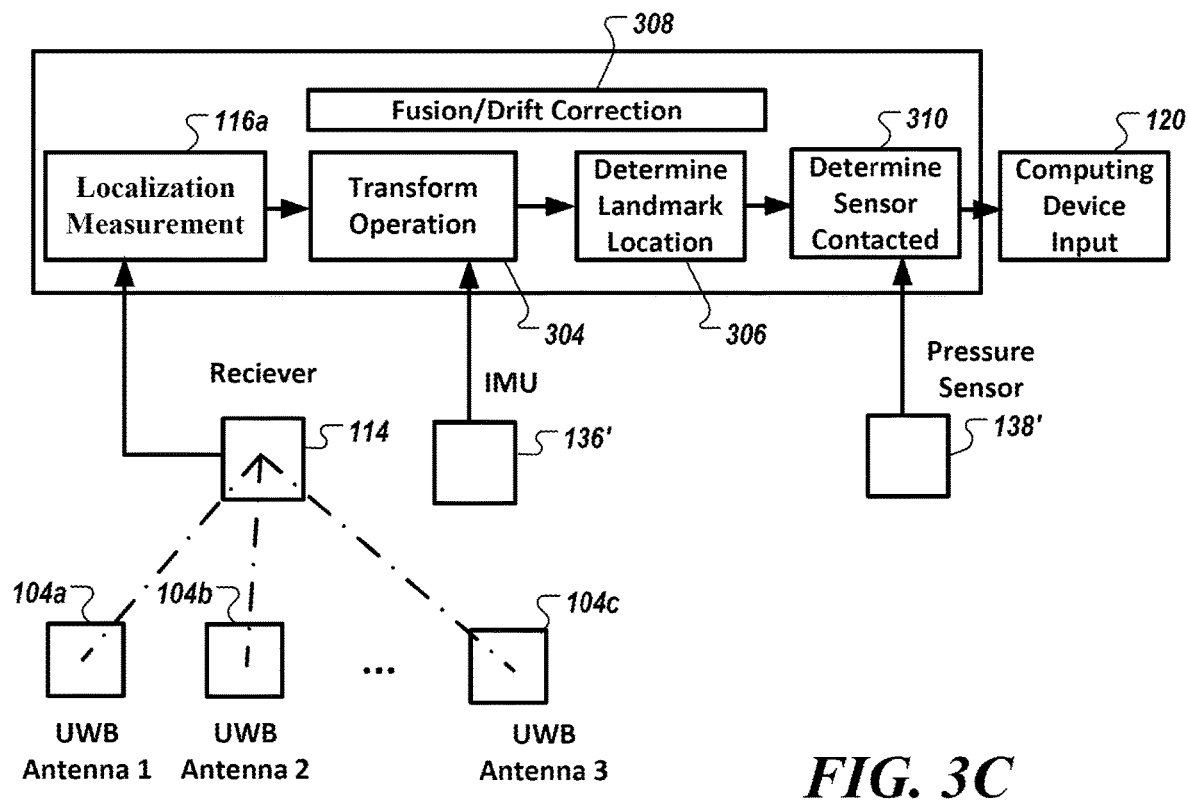

In the example shown in FIG. 3C, the base station receiver 114 also receives a plurality of time measurements and one or more phase measurements (as a TDoA and/or PDoA measure) from a plurality of antennas 104a, 104b, 104c to determine, via a localization measurement operation 116a, the localization measurement value 302. The base station receiver 114 also receives orientation data from IMU 136' and use the orientation data to determine, via a transform operation 304, the second landmark localization 306 corresponding to the landmark 118 of interest and provide the second landmark localization 306 as the input to the computer device 120. The base station receiver 114 further performs a contact sensing operation 310 using the sensor data from pressure sensor 138' to provide the contact sensing input to the computer device 120.

Figure 3D:
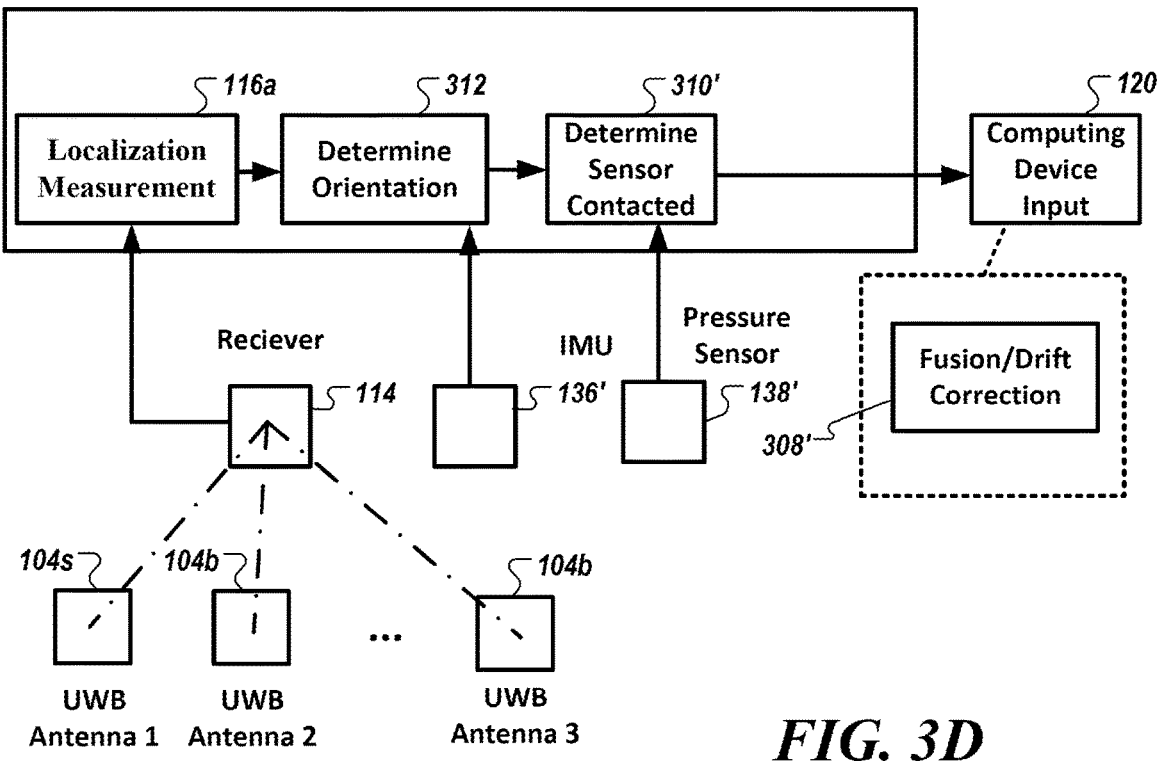

In the example shown in FIG. 3D, the base station receiver 114 also receives a plurality of time measurements and one or more phase measurements (as a TDoA and/or PDoA measure) from a plurality of antennas 104a, 104b, 104c to determine, via a localization measurement operation 116a, the localization measurement value 302. The base station receiver 114 also receives orientation data from IMU 136' and use the orientation data to determine, via orientation determination operation 312, the IMU orientation data. The base station receiver 114 also performs a contact sensing operation 310' using the sensor data from pressure sensor 138' to determine contact data. The base station receiver 114 provides the orientation data and contact data to the computer system 120 which receives the data and executes the fusion/drift correction operation 308' to locally determine the localization measure for the landmark 118 of interest.

Experimental Results and Examples

Figure 5A:
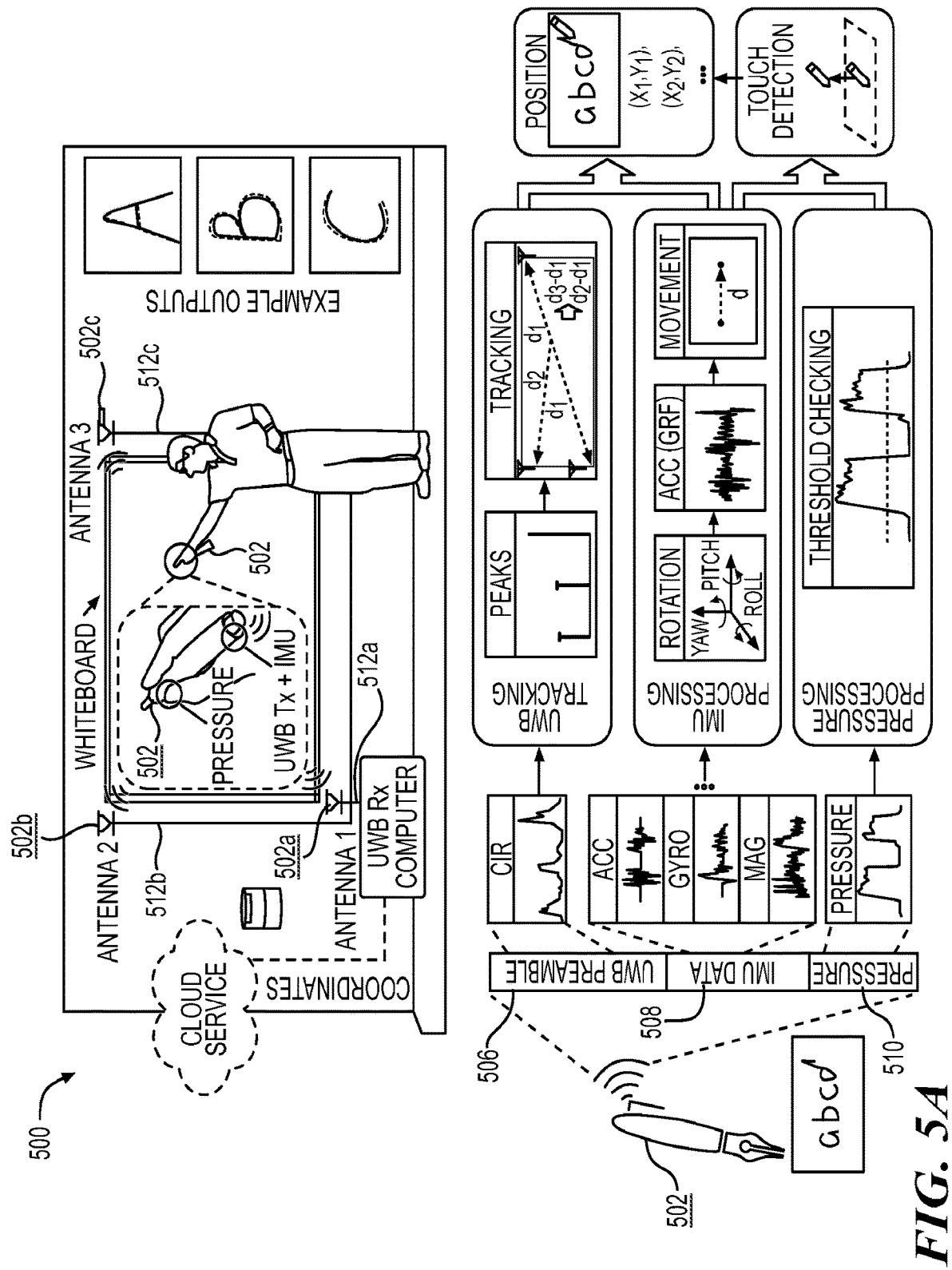
FIGS. 5A, 5B, and 5C show an example configuration of components a movement digitization system (referred to as "ITrackU") that embodies the example user-interface (UI) system of FIGS. 1A-1C in accordance with an illustrative embodiment.

FIG. 5A shows an example configuration of a movement digitization system 500 (referred to as "ITrackU") that was developed to provide accurate movement-tracking of a pen-like instrument 502 across a large surface that can provide replication, replay, or digitization of a performed action. The ITrackU system 500 does not require instrumentation in or on the surface or in the tracked instrument's tip, though it is not limited from having such instrumentation. In the example shown in FIG. 5A, the ITrackU system 500 includes a ultra-wideband radio (UWB) 106 (shown as 506), an inertial measurement unit (IMU) 136 (shown as 586), and a pressure sensor 138 (shown as 510), integrated into a pen-like instrument 502. The pen-like instrument 502 operates with a set of UWB receivers that executes a fusion operation to combine measurements from these sensors to provide millimeter scale localization of the instrument's location, its tilt, and the exact moments when it touches the surface over a surface larger than 2 meters in length and collectively can cost a fraction of the current smart-surface systems.

The fusion operation can further be used to compensate for each individual sensor's shortcomings. The ITrackU system can provide a cost-effective, low-bandwidth solution to the problem of tracking a pen-like instrument. The ITrackU system can generate a stream of touch locations and record the relative locations while using a minimal set of data about the actions on the surface. The exemplary ITrackU system can be implemented using low-cost localization of a pen-like instrument's tip on a work surface. Indeed, the ITrackU system can obtain the tip's location without deterring from the instrument's functionality, and without altering the work-surface.

The exemplary system can have widespread applications, for example, in education (enabling an instructor to write on a large whiteboard while automatically digitizing the writing in real-time), in industrial IoT and robotics (monitoring the actions of miniature robotic arms assembling electronics), in artistic works (capturing the strokes in calligraphy), and among other usage described herein. A common thread binds these rather diverse applications it is impractical to embed electronics into the work-surface (because that modifies the surface), or the tip of the work instrument.

The exemplary localization and UI system can localize the pen's base (instead of the tip) and estimate the tilt angle and instances when the pen touches the surface to approximate the locations of the tip as it moves on the surface. The ITrackU system can perform fine-grained wireless localization, including active localization of a tiny ultra-wideband (UWB) transmitter module on a pen's base. This transmitter can continuously emit UWB wireless packets that are captured by a single multi-antenna UWB receiver (keeping the hardware cost low) situated outside the work-surface. The antennas can be located far apart, e.g., at different corners of the work surface. The time and phase differences between the signal received by each of the corner antennas can be analyzed to track minute or large changes in the pen's location. To translate the pen-base's location to the tip's location, an inertial measurement unit (IMU) can be employed to determine the pen's tilt angle. The IMU data, when fused with UWB localization also helps in improving localization accuracy during instances when UWB signals are obstructed. And, to detect the instances when the pen touches the surface, a pressure sensor is employed in certain embodiments by being attached to the side of the pen, which helps measure the pressure exerted by the user's grip that inadvertently increases due to the friction between the pen and the surface—this force is markedly significant when the pen touches the surface. The IMU and pressure sensor data can be aggregated at the pen's transmitter module and encoded into successive UWB packets. Thus, the multi-antenna receiver module can simultaneously analyze the UWB signal's time-difference-of-arrival at the corner antennas (to localize the base of the pen), and the tilt angle and touch instances. The final output from the receiver module is just a stream of touch locations; a rather minimal amount of information which can be easily stored or transmitted over the Internet to client devices where the user's writings can be recreated in real-time.

UWB allows large surfaces (as a non-limiting example, the exemplary embodiment was evaluated over a 2.5 m×2 m area) to be digitized in a variety of different environments. Examples of surface area sizes includes 0.35 m×0.5 m, 0.4 m×0.6 m, 0.5 m×0.7 m, 0.6 m×0.9 m, 0.8 m×1.2 m, 1 m×1.5 m, 1 m×2 m, 0.8 m×1.2 m, 0.6 m×0.9 m, 0.45 m×0.6 m, 0.45 m×0.3 m, 1.2 m×2.7 m, 1.2 m×2.4 m, 1.2 m×1.8 m and equivalents in the English units (e.g., inches). The surface area sizes can be substantially greater than 2 m×2.5 m, e.g., 2 m×4 m, 2 m×5 m, 2 m×6 m, 2.5 m×4 m, 2.5 m×5 m, 2.5 m×6 m, 3 m×4 m, 3 m×5 m, 3 m×6 m, 4 m×4 m, 4 m×5 m, 4 m×6 m.

In addition, multiple ITrackU systems or various embodiments disclosed herein can be concurrently placed in proximity to one another.

Figure 5B:
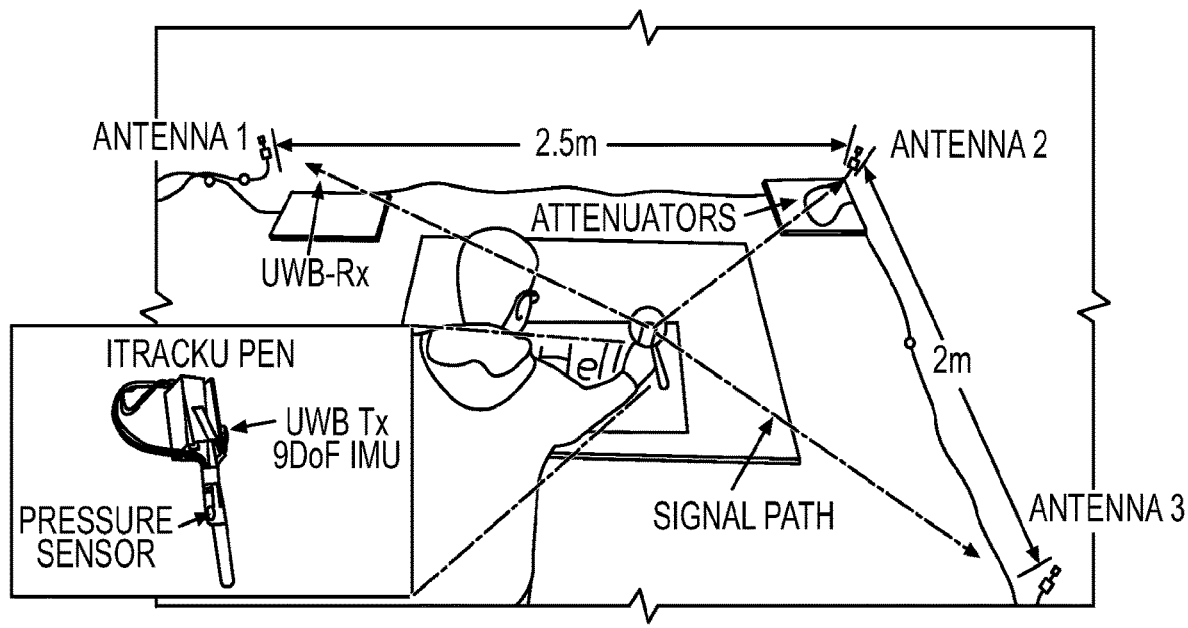

FIG. 5B shows an example prototype of the ITrackU system. A custom-built electronic cap 504 was fabricated and attached to the base of a pen-like instrument to be tracked. The cap 504 included a microcontroller that was configured to record data from an on-board inertial sensor and a pressure sensor. A pressure sensitive strip was attached to the pen's side to a point where the user holds the pen to capture the force exerted by the user to detect touch events.

The cap also included a UWB wireless transmitter configured to periodically send UWB packets 506 containing the IMU and pressure sensor data. These packets are received by a UWB receiver with 3 antennas 502a, 502b, 502c.

The UWB packets carry sensor data from the pen to the UWB receiver, and also inherently expose timing information which the receiver uses to localize the pen. In the example shown in FIG. 5A, the UWB packets 506 includes a UWB preamble comprising RF pulses for a CIR, a IMU data portion 508, and a pressure data portion 510. In alternative embodiments, the IMU data and/or pressure data can be transmitted through a second communication channel (e.g., a second UWB channel or a separate non-UWB channel) or through a different communication protocol.

The ITrackU system employs, in some embodiments, a 3-antenna setup, with each antenna placed at a different corner around the work surface. All antennas are connected to a single UWB receiver using different lengths of RF cable 512a, 512b, 512c. This configuration can produce multiple copies of the transmitted signal arriving at the UWB-receiver within a few nanoseconds, e.g., as described in relation to FIG. 2B. Given UWB's large bandwidth (1 GHz), it is possible to identify subtle timing differences between signal copies by evaluating the channel's impulse response (CIR). The radio's physical layer (PHY) obtains the CIR by correlating the received preamble with known golden sequences. Analyzing reception timings and signal phases in the CIR allows localization of the pen's transmitter.

The IMU information, e.g., in every UWB packet can provide 9-degrees of freedom (DoF) data about the pen's inertial frame of reference to facilitate the computation of the pen's orientation. The ITrackU system employed phase-based tracking that was susceptible to phase wraps; IMU data and fusion algorithm described herein were implemented to correct for such errors.

The ITrackU system can filter the location information based on the touch information produced by the pressure sensor to generate a stream of <x; y> coordinates as UI input to a computer system. The coordinates were stored and transmitted over the Internet for rendering the user's drawings on remote computers in the study.

Writing Instrument Hardware. In the study, the ITrackU prototype system included a pen's cap-setup configured to transmits UWB packets that employed a DW1000 chip (costing about $18), a Adafruit Feather MO microcontroller (costing about $20), a 9DoF IMU (costing about $18), and a Sparkfun force sensitive resistor (costing about $21). The IMU included an iNEMO 6DoF inertial sensor (accelerometer and gyroscope) and a LIS3MDL 3-axis magnetometer. The components are assembled on a PCB board, 4.5 cm×2 cm in sizez. The whole transmitter prototype was fabricated using commercially off the shelf components that cost less than $80 in total and weighs less than 34 grams (sufficient as a writing instrument). The cap collected data from the IMU and the pressure sensor at a 200 Hz data rate. A group of IMU measurements was radioed out as a batch using UWB packets. The UWB signal were transmitted at 3.993 GHz center frequency and with a 1 GHz bandwidth. To accommodate the higher data rate generated by the IMU, each UWB packet included 5 sets of IMU and pressure readings for rate matching. On reception of the signal, the receiver triggers internal signal processing pipeline to generate CIR. Thus, UWB packets function as both, a sensing mechanism to track the position, and a communication mechanism for packet transmission.

The electronic components were a few mm² each (see Table 2) and can be miniaturized with inexpensive manufacturing technology. The ITrackU system employed Lipo battery LP503035 (3.7V, 500 mAh).

TABLE 2

| Description | Product Number | Size |
| --- | --- | --- |
| Microcontroller | ATSAMD21G18A | 7 mm × 7 mm |
| UWB Chip | DW1000 | 6 mm × 6 mm |
| Accelerometer + Gyro | ISM330DHCX | 2.5 × 3 mm |
| Magentometer | LIS3MDL | 2 mm × 2 mm |
| UWB Antenna | UWB 06 | 6 mm × 8 mm |

Receiver Hardware. The ItrackU system included, at the receiver end, three antennas at three corners of a 2.5 m×2 m tracking region. The antennas were wired to a Decawave Trek1000 development board through a 3-way RF splitter with different length of delaying cables. In this prototype, the Decawave Trek1000 extracted a 100-tap CIR (0.4 KB) and then relayed the CIR and other received data over a USB-serial port to a laptop, which ram the pipeline in Matlab R2019a.

Evaluation Methodology. In a first aspect of the evaluation, various operations of the ITrackU device were evaluated in benchtop analysis. FIGS. 6A-6E each shows examples of device's benchtop performance. In a second aspect of the evaluation, the performance of ITrackU was evaluated a real-world indoor home environment. FIGS. 7A-7L each shows examples of the ITrackU system in the real-world indoor home environment.

Figure 5C:
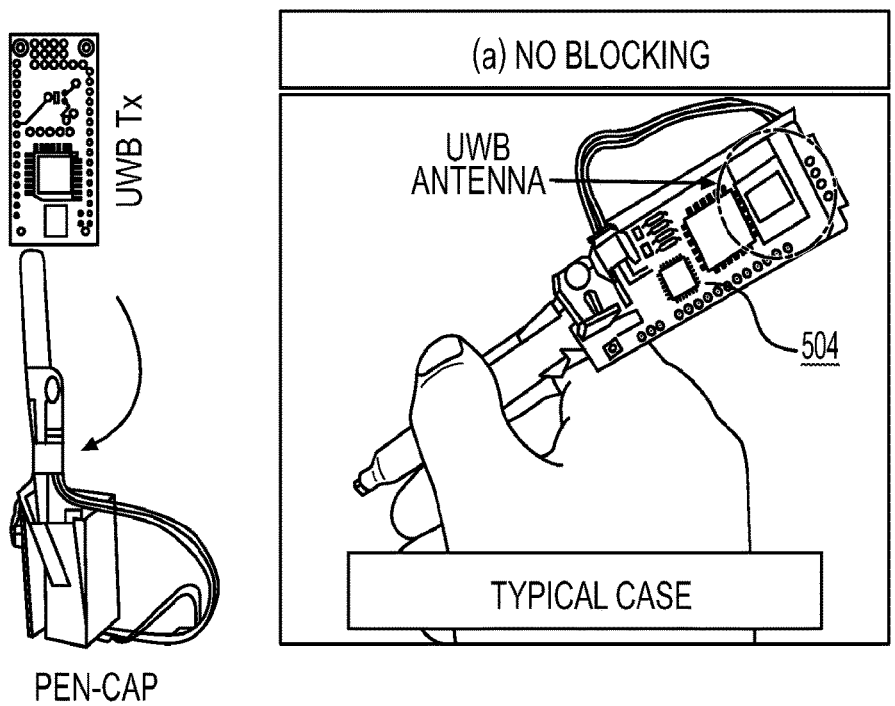

The study also acquired accurate ground truth using a 37.6 cm×30.3 cm resistive touch screen [3] that was placed within same region on which various writing tasks for evaluated. The experiment provided a ground truth trace with a resolution of 2 mm. In certain evaluations, the study also employed a camera-based ground-truth in which the pen-cap-setup was clamped on the back of a marker pen and held by a user (see FIG. 5C). During the evaluation, an evaluator wrote or drew shapes on the whiteboard ITrackU system at normal handwriting speed. FIGS. 8A-8D show example captured outputs of the evaluation.

Figure 7A:
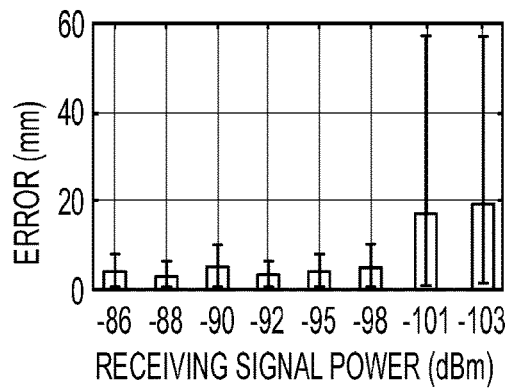

Accuracy under different SNR: The study evaluated the accuracy performance of the ITrackU under different signal strength operations for different transmitter's power gain. A stencil was used when writing to ensure the same movement among different SNRs. At the receiver, the study collected CIR for every packet transmission and translate the amplitude of CIR into RSS [4]. FIG. 7A shows the error (y-axis) as compared to the different signal strength (x-axis) at 5 percentile and 95 percentile error under different RSS. It can be observed that the ITrackU system operate in a stable manner with no effect due to signal strength when the signal was in excess of −98 dBm. Errors increased when the RSS drops to −101 dBm.

Figure 7B:
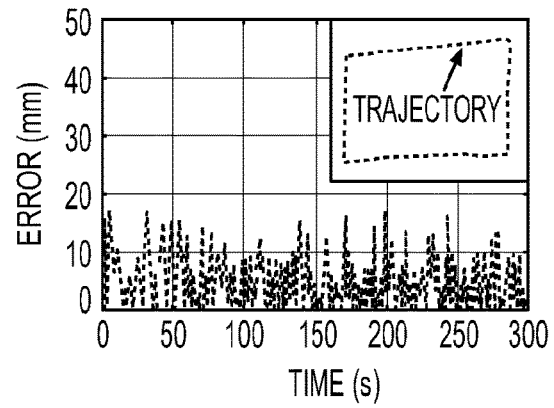

UWB Tracking Benchmark—Temporal property: To evaluate ITrackU's performance over time, a stencilled rectangular pattern (37 cm×30 cm) was repeatedly traced on the touch screen for 5 minutes. FIG. 7B shows the error as a function of time. It can be observed that the error appeared to be uniformly distributed with no visible drift, thus indicating that the ITrackU is capable of long-term tracking operation. FIG. 7B also shows the trace in an inset.

Figure 7C:
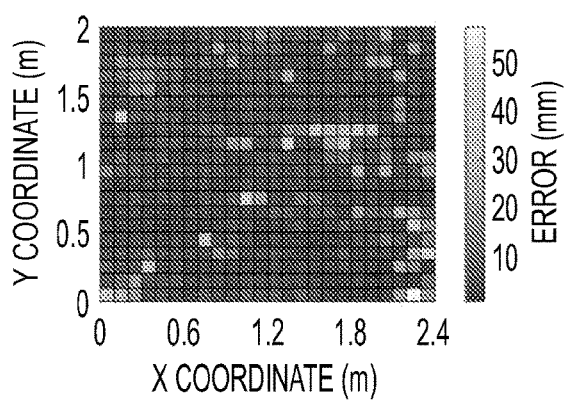

UWB Tracking Benchmark—Spatial property: The study evaluated the influence of attenuation, multipath, and other spatial interference. The study evaluated experimental region comprising a set of 10 cm×10 cm grids and errors within each grid. FIG. 7C shows the relationship between the error and the location via a matrix of positional variation in accuracy. It was observed that while most of grids have less than 10 mm error, there are also high-error grids (>2 cm) distributed sporadically. CIR analysis revealed two potential causes for increased errors: (i) one of the antennas received disproportionately high signal strength and (ii) at certain spots, the true CIR first-peak merges with a close multipath, affecting the phase readings.

Fusion Benchmark: The study also evaluated the performance of the fusion algorithm under a number of scenarios.

Fusion Benchmark—Effect of writing speed: UWB tracking can experience wrapping error if the user writes too fast; the IMU can help correct the wrong phase by estimating number of wraps from the motion data. Because of the high-pass filter that may be applied by the IMU controller, the IMU assessment can be more accurate when the user is writing fast. To quantify the trade-off in performance at different speeds, the instant study evaluated a writing actions on a touch screen at different speeds. RF absorbers were placed in the field to remove the effect of potential multipath. The touch screen provides a stream of ground truth trace and the writing speed.

Figure 7D:
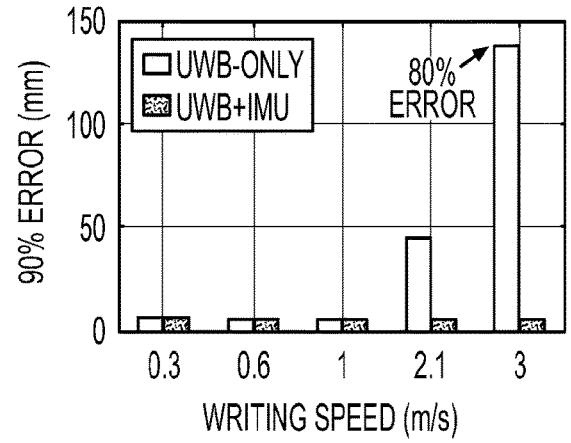
Figure 7E:
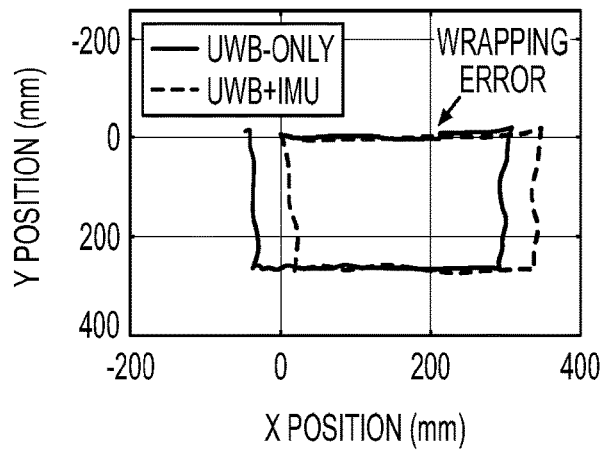

FIG. 7D shows a comparison of the error (y-axis) of the ITrackU system with the inertial measurement unit disabled as compared to the ITrackU system operating with the inertial measurement unit enabled. In FIG. 7D, the x-axis denotes the maximum instantaneous speed during writing. Among these speeds, 0.6 m/s-2.1 m/s were the usual writing speeds. When the writing speed is 1 m/s or smaller, the study observed the two configurations achieved comparable and low error. It was observed that wrapping occurred more frequently when the writing speed was increased to 2.1 m/s. As compared to the UWB-only approach, it was observed that the ITrackU system achieved sub-centimeter level error (4.4 mm and 3.6 mm) after IMU-based compensation. This demonstrated the ITrackU system's capability to sustain high accuracy operation under high speed writing conditions. FIG. 7E shows a comparison of the phase wrapping error of the ITrackU system with inertial measurement unit disabled as compared to the ITrackU with the inertial measurement unit enabled.

Figure 7F:
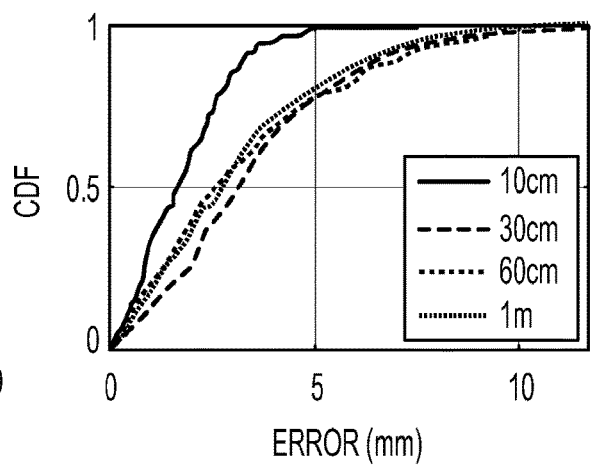

Fusion Benchmark Tracking Different Character Sizes: The performance of ITrackU was also evaluated with varying sizes of tracking patterns. In whiteboard applications, the tracked characters or patterns can have a size ranging from 10 cm to 1 m or more. The study evaluated four scenarios: squares with edge length of 10 cm, 30 cm, 60 cm and 1 m. FIG. 7F shows the amount of error measured at different font sizes. It was observed that all the ITrackU can track three sizes with mm-level median error, namely 1.7 mm, 3.1 mm, 2.5 mm and 2.7 mm, respectively. It was also observed that there were no significant increase in error as the font size increased to 1 m illustrating the system ability to track a wide range of font sizes without error accumulation.

Figure 7G:
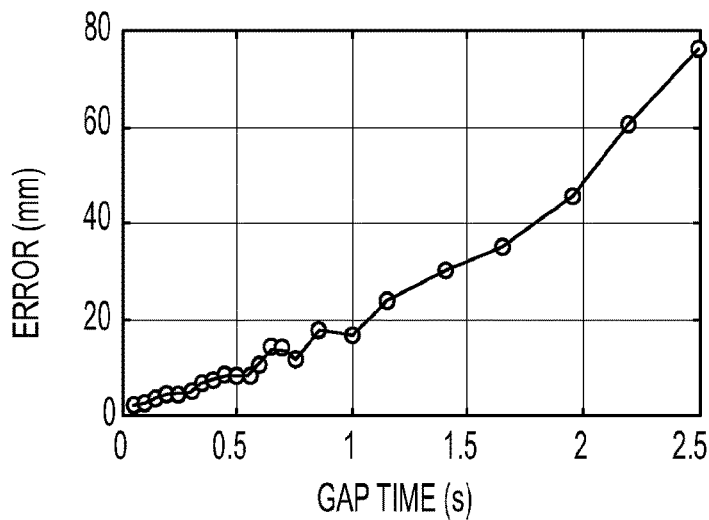

Fusion Benchmark—Continuous working time of IMU: The ITrackU system allowed the IMU to take over tracking during low-confidence CIR (LC-CIR) durations. FIG. 7G shows the amount of error measured as a function of time when the ultrawideband signal is absent and replaced by the IMU. It was observed that the error increases with increasing lengths of LC-CIR durations. It was also observed that when the LC-CIR duration is less than 0.5 s, the system products reasonable overall error that is less than 10 mm.

Figure 7H:
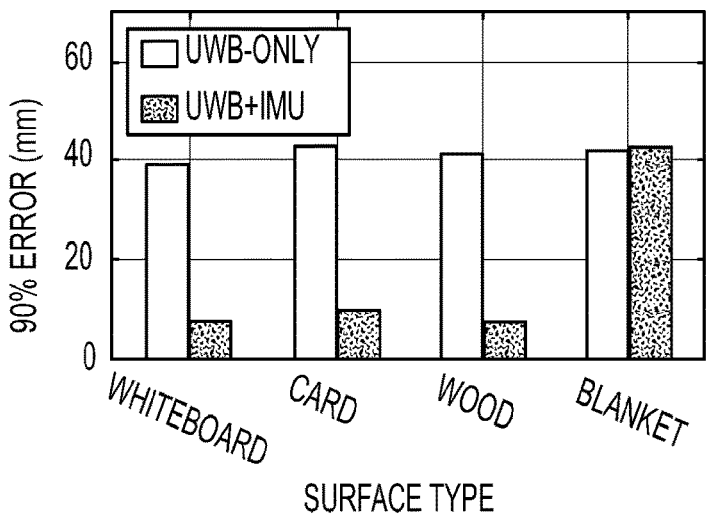

Fusion Benchmark Effect of Surfaces: The study also evaluated the ITrackU system on different surfaces representing a variety of smoothness and textures: whiteboard, cardboard, wood, and blanket. FIG. 7H shows a comparison of the error associated with each of the different surfaces. It was observed that the fusion operation (with IMU data) significantly improved the UWB-localization operation for white board, cardboard, and the wooden board.

Figure 7I:
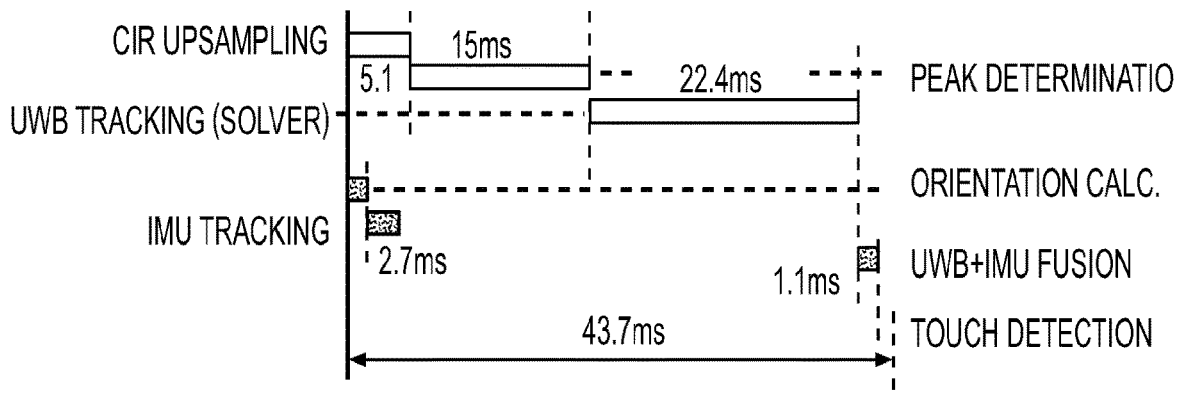

Fusion Benchmark Time Consumption: The study also evaluated the overall ITrackU pipeline among the various components, including CIR upsampling, peak determination, UWB tracking, orientation calculation, IMU tracking, fusion, and touch detection. FIG. 7I shows the measured time employed for the different method steps. It was observed that the CIR peak determination and UWB tracking were the most time intensive operations. The whole pipeline operation can take less than 44 ms, yielding 22 Hz sampling rate. The pipeline can be further optimized to reduce computation requirements for the CIR peak determination and UWB tracking to increase the system's sampling rate.

Fusion Benchmark—Signal blocking test: The study also evaluated the performance of the ITrackU system in harsh environments relating to occlusions. FIG. 7J shows the result of an experiment to determine tracking error during a partial blocking test.

The study evaluated the occlusion test in four sub-regions (labeled R1-R4). In each region, 3 experiments are performed, labeled as AT1, AT2, and AT3. Each sub-region had the one antenna blocked (in AT1, regions R2, R3 are block; in AT2, regions R1, R4 are blocked). The transmitter power gain was set constant at 18.5 dB5. When ITrackU fails to localize, it is labeled "x" in FIG. 7J.

Fusion Benchmark—Charge Cycle: The study also evaluated the battery life of the ITrackU system. The transmitter of the writing instrument included a LiPo battery LP503035 (3.7V, 500 mAh). It was observed to have 10.8 hours of battery life. This battery was 35×30×6 mm in size—acceptable size for writing instrument.

Visual Performance:

Touch Detection Performance: The study also evaluated the performance of touch detection using the pressure sensor in 5 different patterns of pen-lift and touch sequences: (i) one-stroke (1-S) characters, like "C"; (ii) two-stroke (2-S) character (2-S, like "B"); (iii) three-stroke character (3-S, like "A"); (iv) free-form curve (Free); and a (v) dashed line (Dash). FIG. 7L shows the accuracy performance in these test conditions. It was observed that in most cases, pressure-based touch detection achieved over 90% accuracy for patterns (i)-(iii) (i.e., having no breaks or only a few breaks in the writing). FIG. 7K shows the accuracy of the ITrackU system as compared to conventional writing alternatives (ink pen, pencil, markers). It was observed that the system had mm-level accuracy when UWB and IMU fusion was performed.

Figure 8A:
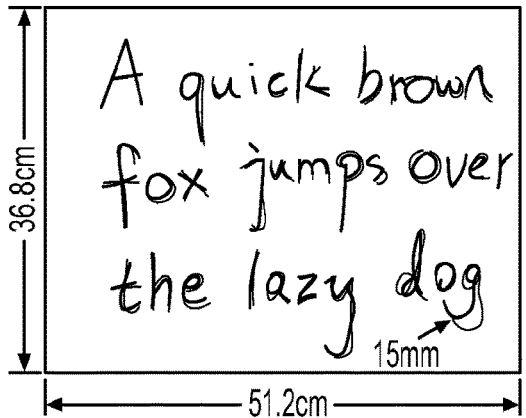
FIGS. 8A-8D show example captured outputs of the evaluation of the ITrackU system in accordance with an illustrative embodiment.
Figure 8B:
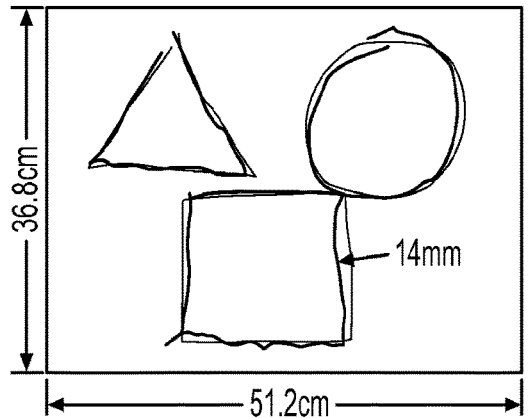
Figure 8C:
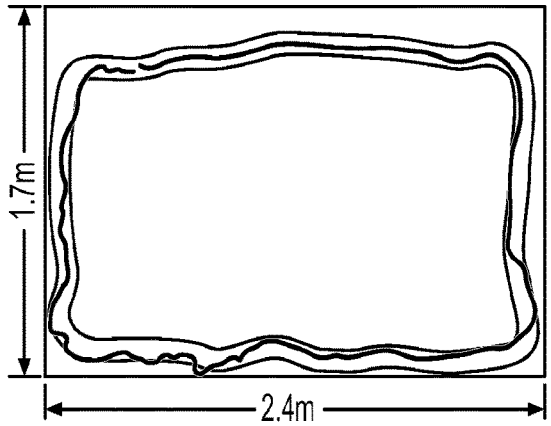
Figure 8D:
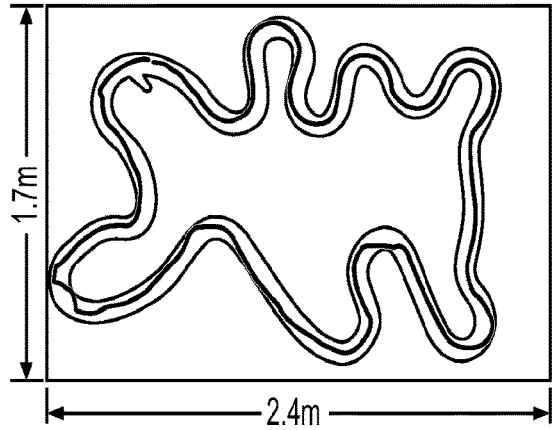

FIGS. 8A-8B show examples of tracking results using the ITrackU system.

Discussion

ITrackU addresses fundamental problems in fine-grained wireless tracking, presenting a sensor-fusion approach in digitizing an instrument's movements on an unmodified surface. The present disclosure also contemplates that tracking can be enhanced through different techniques. One technique is by smoothing the output trajectory (such as using [40]) and by interpreting the written text or shapes drawn (such as in [36]). Second, the magnetometer readings can be corrupted by external magnetic fields which need to be compensated for through calibration. The use of the IMU is central to orientation and tilt tracking; its effectiveness is influenced by the quality of the sensor data.

Third, wireless signals can inherently leak information, and embodiments of the present disclosure contemplate that some or all signals can be encrypted. E.g., UWB packets can be encrypted (IMU and pressure sensor information). In summary, the ITrackU system and certain embodiments described herein presents an approach of combining UWB, as the primary tracking technique, with IMU, to bring multifaceted benefits in accuracy, range, robustness, and cost, to the problem of tracking a pen-like instrument.

Table 3 illustrates a summary of these localization methods compared to an embodiment of the present disclosure.

TABLE 3

| Approach | Type | Error | Cost | Range (m) |
| --- | --- | --- | --- | --- |
| RF-IDraw [51] | RFID | 37 mm | High | ~5 × 6 |
| mTrack [53] | 60 GHz | 8 mm | High | 1 × 1 |
| PolarDraw [43] | RFID | 103 mm | Middle | ~0.56 × 0.865 |
| Strata [63] | Acoustic | 8 mm | Low | 0.5 × 0.5 |
| MilliBack [55] | Backscatter | 4.9 mm | High | 0.5 × 0.8 |
| ITrackU | UWB + IMU | 7 mm | Low | 2.5 × 2 |

Capacitive resistive screen: Existing solutions based on capacitive (passive) sensing or resistive (active) sensing can trigger responsive physical feedback to user event [5-7]. Both of them can require support from specialized hardware where the cost increases dramatically with the size of the screen.

Radio front-end: High-precision RF-based tracking has been extensively explored. Position can be inferred from wireless signature like received signal strength (RSS) [26, 32, 50] and phase [9, 10, 39, 53, 54, 57, 58]. However, pure RSS-based approaches have poor accuracy as large as 1 m [32]. PolarDraw [43] reduces the required number of antennas for RFID tracking by inferring the orientation and position of the RFID-tagged pen through electromagnetic polarization features. RF solutions to high-precision tracking include [29, 51, 53, 55, 58]. RF-IDraw [51] tracks motion with the interferometry property of multiple RFIDs and achieves 3.7 cm median error within 5 m range. mTrack [53] is the first sub-centimeter solution, which tracks the phase change of rejected signal from the object with 60 GHz millimeter wave radios. MilliBack [55] embeds the backscatter tag in the pen and tracks the position of the pen with phase differential iterative schemes, achieving a median error of 4:9 mm. UWB strikes a trade-off between precision and propagation range, resulting in abundant applications in localization [13, 16, 20, 30]. Two-way ranging (TWR) is the most widely used method for UWB to achieve centimeter level accuracy [1]. ITrackU takes a different approach than TWR. We fuse IMU with UWB, resulting in a robust mm-level accuracy.

Acoustic: Acoustic signal can be used for tracking [8, 12, 28, 35, 37, 52, 60-62]. Recently, Strata [57] achieves 8 mm error by tracking the position from the phase shift of the audio signal. However, the small propagation range, the inherent weakness of the audio signal, limits the widespread use of acoustic-based tracking [11].

IMU: IMU sensors can be used for tracking by double integrating the acceleration. Because of the drifting nature of the double integration [49], IMU sensing is typically applied in certain scenarios allowing recalibration. For example, ArmTrak [44] and ArmTroi [33] can track the motion of arms, which can be recalibrated by the fixed structure of the human skeleton.

Heterogeneous approaches: Jointly using multiple streams of data, such as the audio-vision signal [45, 64] or RF-IMU data [18, 19], in one application provides the flexibility of synthesizing benefits from different sensors.

ITrackU provides benefits in multiple dimensions, including precision, range, cost, on tracking through fusion of UWB and IMU. Such fusion takes the advantages of both UWB and IMU, achieving a median error of 2:9 mm (7 mm at 90%) in a range of 2:5 m×2 m meanwhile retaining robustness even in some extreme cases.

Example Computing System

It should be appreciated that the logical operations described above and in the appendix can be implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as state operations, acts, or modules. These operations, acts, and/or modules can be implemented in software, in firmware, in special purpose digital logic, in hardware, and any combination thereof. It should also be appreciated that more or fewer operations can be performed than shown in the figures and described herein. These operations can also be performed in a different order than those described herein.

The computer system is capable of executing the software components described herein for the exemplary method or systems. In an embodiment, the computing device may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computing device 200 to provide the functionality of a number of servers that are not directly bound to the number of computers in the computing device. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or can be hired on an as-needed basis from a third-party provider. Some cloud computing environments may comprise cloud computing resources owned and operated by the enterprise as well as cloud computing resources hired and/or leased from a third-party provider.

In its most basic configuration, a computing device includes at least one processing unit and system memory. Depending on the exact configuration and type of computing device, system memory may be volatile (such as random-access memory (RAM)), non-volatile (such as read-only memory (ROM), flash memory, etc.), or some combination of the two.

The processing unit may be a standard programmable processor that performs arithmetic and logic operations necessary for the operation of the computing device. While only one processing unit is shown, multiple processors may be present. As used herein, processing unit and processor refers to a physical hardware device that executes encoded instructions for performing functions on inputs and creating outputs, including, for example, but not limited to, microprocessors (MCUs), microcontrollers, graphical processing units (GPUs), and application-specific circuits (ASICs). Thus, while instructions may be discussed as executed by a processor, the instructions may be executed simultaneously, serially, or otherwise executed by one or multiple processors. The computing device may also include a bus or other communication mechanism for communicating information among various components of the computing device.

Computing devices may have additional features/functionality. For example, the computing device may include additional storage such as removable storage and non-removable storage including, but not limited to, magnetic or optical disks or tapes. Computing devices may also contain network connection(s) that allow the device to communicate with other devices, such as over the communication pathways described herein. The network connection(s) may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. Computing devices may also have input device(s) such as keyboards, keypads, switches, dials, mice, trackballs, touch screens, voice recognizers, card readers, paper tape readers, or other well-known input devices. Output device(s) such as printers, video monitors, liquid crystal displays (LCDs), touch screen displays, displays, speakers, etc., may also be included. The additional devices may be connected to the bus in order to facilitate the communication of data among the components of the computing device. All these devices are well known in the art and need not be discussed at length here.

The processing unit may be configured to execute program code encoded in tangible, computer-readable media. Tangible, computer-readable media refers to any media that is capable of providing data that causes the computing device (i.e., a machine) to operate in a particular fashion. Various computer-readable media may be utilized to provide instructions to the processing unit for execution. Example tangible, computer-readable media may include but is not limited to volatile media, non-volatile media, removable media, and non-removable media implemented in any method or technology for storage of information such as computer-readable instructions, data structures, program modules, or other data. System memory 230, removable storage, and non-removable storage are all examples of tangible computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In light of the above, it should be appreciated that many types of physical transformations take place in the computer architecture in order to store and execute the software components presented herein. It also should be appreciated that the computer architecture may include other types of computing devices, including hand-held computers, embedded computer systems, personal digital assistants, and other types of computing devices known to those skilled in the art.

In an example implementation, the processing unit may execute program code stored in the system memory. For example, the bus may carry data to the system memory 230, from which the processing unit receives and executes instructions. The data received by the system memory may optionally be stored on the removable storage or the non-removable storage before or after execution by the processing unit.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and it may be combined with hardware implementations.

It will be apparent to those skilled in the art that various modifications and variations can be made in the present disclosure without departing from the scope or spirit of the invention. Other embodiments of the disclosure will be apparent to those skilled in the art from consideration of the specification and practice of the methods disclosed herein. It is intended that the specification and examples be considered as exemplary only, with a true scope and spirit of the invention being indicated by the following claims.

It should be appreciated that the logical operations described above and, in the appendix, can be implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as state operations, acts, or modules. These operations, acts and/or modules can be implemented in software, in firmware, in special purpose digital logic, in hardware, and any combination thereof. It should also be appreciated that more or fewer operations can be performed than shown in the figures and described herein. These operations can also be performed in a different order than those described herein.

Some references, which may include various patents, patent applications, and publications, are cited in a reference list and discussed in the disclosure provided herein. The citation and/or discussion of such references is provided merely to clarify the description of the disclosed technology and is not an admission that any such reference is "prior art" to any aspects of the disclosed technology described herein. In terms of notation, "[n]" corresponds to the nth reference in the reference list. For example, Ref [1] refers to the $1^{st}$ reference in the list. All references cited and discussed in this specification are incorporated herein by reference in their entireties and to the same extent as if each reference was individually incorporated by reference.

Moreover, the various components may be in communication via wireless and/or hardwire or other desirable and available communication means, systems and hardware. Moreover, various components and modules may be substituted with other modules or components that provide similar functions.

Although example embodiments of the present disclosure are explained in some instances in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

It must also be noted that, as used in the specification and the appended claims, the singular forms "a," "an" and "the" include plural referents unless the context clearly dictates otherwise. Ranges may be expressed herein as from "about" or "5 approximately" one particular value and/or to "about" or "approximately" another particular value. When such a range is expressed, other exemplary embodiments include from the one particular value and/or to the other particular value.

By "comprising" or "containing" or "including" is meant that at least the name compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the present disclosure. Similarly, it is also to be understood that the mention of one or more components in a device or system does not preclude the presence of additional components or intervening components between those components expressly identified.

As discussed herein, a "subject" may be any applicable human, animal, or other organism, living or dead, or other biological or molecular structure or chemical environment, and may relate to particular components of the subject, for instance specific tissues or fluids of a subject (e.g., human tissue in a particular area of the body of a living subject), which may be in a particular location of the subject, referred to herein as an "area of interest" or a "region of interest."

It should be appreciated that as discussed herein, a subject may be a human or any animal. It should be appreciated that an animal may be a variety of any applicable type, including, but not limited thereto, mammal, veterinarian animal, livestock animal or pet type animal, etc. As an example, the animal may be a laboratory animal specifically selected to have certain characteristics similar to human (e.g., rat, dog, pig, monkey), etc. It should be appreciated that the subject may be any applicable human patient, for example.

The term "about," as used herein, means approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. In one aspect, the term "about" means plus or minus 10% of the numerical value of the number with which it is being used. Therefore, about 50% means in the range of 45%-55%. Numerical ranges recited herein by endpoints include all numbers and fractions subsumed within that range (e.g., 1 to 5 includes 1, 1.5, 2, 2.75, 3, 3.90, 4, 4.24, and 5).

Similarly, numerical ranges recited herein by endpoints include subranges subsumed within that range (e.g., 1 to 5 includes 1-1.5, 1.5-2, 2-2.75, 2.75-3, 3-3.90, 3.90-4, 4-4.24, 4.24-5, 2-5, 3-5, 1-4, and 2-4). It is also to be understood that all numbers and fractions thereof are presumed to be modified by the term "about."

The following patents, applications and publications as listed below and throughout this document are hereby incorporated by reference in their entirety herein.

[1] Ieee standard for low-rate wireless networks. IEEE Std 802.15.4-2015 (Revision of IEEE Std 802.15.4-2011), pages 1-709, 2016.

[2] Magnetic calibration algorithms, 2016. https://www.nxp.com/docs/en/application-note/AN5019.pdf.

[3] 4-wire analog resistive touch screen datasheet, 2017. https:/media.digikey.com/pdf/Data %20Sheets/NKK %20PDFs/FT_Series_4-Wire_Ds_Oct_2017.pdf.

[4] Decawave user manual, 2017. https://www.decawave.com/sites/default/fault/resources/dw1000_user_manual_2.11.pdf.

[5] Microsoft surface pen, 2017. https://news.microsoft.com/uploads/2017/05/SurfacePenFS.pdf.

[6] Apple pencil, 2018. https://www.apple.com/apple-pencil/.

[7] S pen, 2018. https://www.samsung.com/global/galaxy/galaxy-note10/s-pen/.

[8] MAVL: Multiresolution analysis of voice localization. In 18th USENIX Symposium on Networked Systems Design and Implementation (NSDI 21), Boston, MA, April 2021. USENIX Association.

[9] Fadel Adib, Zach Kabelac, Dina Katabi, and Robert C Miller. 3d tracking via body radio reflections. In 11th {USENIX} Symposium on Networked Systems Design and Implementation ({NSDI} 14), pages 317-329, 2014.

[10] Fadel Adib and Dina Katabi. See through walls with wifi! In Proceedings of the ACM SIGCOMM 2013 conference on SIGCOMM, pages 75-86, 2013.

[11] Yang Bai, Li Lu, Jerry Cheng, Jian Liu, Yingying Chen, and Jiadi Yu. Acousticbased sensing and applications: A survey. Computer Networks, 181:107447, 2020.

[12] Gaoshuai Cao, Kuang Yuan, Jie Xiong, Panlong Yang, Yubo Yan, Hao Zhou, and Xiang-Yang Li. Earphonetrack: involving earphones into the ecosystem of acoustic motion tracking. In Proceedings of the 18th Conference on Embedded Networked Sensor Systems, pages 95-108, 2020.

[13] Yifeng Cao, Ashutosh Dhekne, and Mostafa Ammar. 6fit-a-part: A protocol for physical distancing on a custom wearable device. In 2020 IEEE 28th International Conference on Network Protocols (ICNP), pages 1-12. IEEE, 2020.

[14] Boxlight Corporation. Mimiocapture ink recorder datasheet, 2016. https://mimio.boxlight.com/wp-content/uploads/2017/03/MimioCapture_SellSheet.pdf.

[15] Decawave. Transmit power calibration and management, 2019. https://www.decawave.com/wp-content/uploads/2019/07/APS023_Part-1_Transmit_Power_Calibration__Management.pdf.

[16] Ashutosh Dhekne, Ayon Chakraborty, Karthikeyan Sundaresan, and Sampath Rangarajan. Trackio: tracking first responders inside-out. In 16th {USENIX} Symposium on Networked Systems Design and Implementation ({NSDI} 19), pages 751-764, 2019.

[17] Tobias Feigl, Sebastian Kram, Philipp Woller, Ramiz H Siddiqui, Michael Philippsen, and Christopher Mutschler. Rnn-aided human velocity estimation from a single imu. Sensors, 20(13):3656, 2020.

[18] Mahanth Gowda, Ashutosh Dhekne, Sheng Shen, Romit Roy Choudhury, Lei Yang, Suresh Golwalkar, and Alexander Essanian. Bringing iot to sports analytics. In 14th {USENIX}Symposium on Networked Systems Design and Implementation ({NSDI} 17), pages 499-513, 2017.

[19] Mahanth Gowda, Justin Manweiler, Ashutosh Dhekne, Romit Roy Choudhury, and Justin D Weisz. Tracking drone orientation with multiple gps receivers. In Proceedings of the 22nd annual international conference on mobile computing and networking, pages 280-293, 2016.

[20] Bernhard Großwindhager, Michael Rath, Josef Kulmer, Mustafa S Bakr, Carlo Alberto Boano, Klaus Witrisal, and Kay Römer. Salma: Uwb-based single-anchor localization system using multipath assistance. In Proceedings of the 16th ACM Conference on Embedded Networked Sensor Systems, pages 132-144, 2018.

[21] Pengfei Guo, Haitao Qiu, Yunchun Yang, and Zhang Ren. The soft iron and hard iron calibration method using extended kalman filter for attitude and heading reference system. In 2008 IEEE/ION Position, Location and Navigation Symposium, pages 1167-1174. IEEE, 2008.

[22] Jose A. Gutierrez, Edgar H. Callaway, and Raymond L. Barrett. IEEE 802.15.4 Low-Rate Wireless Personal Area Networks: Enabling Wireless Sensor Networks. IEEE, 2003.

[23] Evan G Hemingway and Oliver M O'Reilly. Perspectives on euler angle singularities, gimbal lock, and the orthogonality of applied forces and applied moments. Multibody System Dynamics, 44(1):31-56, 2018.

[24] KC Ho and Wenwei Xu. An accurate algebraic solution for moving source location using tdoa and fdoa measurements. IEEE Transactions on Signal Processing, 52(9):2453-2463, 2004.

[25] Ngoc-Huynh Ho, Phuc Huu Truong, and Gu-Min Jeong. Step-detection and adaptive step-length estimation for pedestrian dead-reckoning at various walking speeds using a smartphone. Sensors, 16(9):1423, 2016.

[26] Fang Hongzhao. 60 GHz RSS localization with omnidirectional and horn antennas. PhD thesis, 2010.

[27] Carl Q Howard, Colin H Hansen, and Anthony C Zander. A review of current ultrasound exposure limits. The Journal of Occupational Health and Safety of Australia and New Zealand, 21(3):253-257, 2005.

[28] Wenchao Huang, Yan Xiong, Xiang-Yang Li, Hao Lin, Xufei Mao, Panlong Yang, and Yunhao Liu. Shake and walk: Acoustic direction finding and fine-grained indoor localization using smartphones. In IEEE INFOCOM 2014-IEEE Conference on Computer Communications, pages 370-378. IEEE, 2014.

[29] Chengkun Jiang, Junchen Guo, Yuan He, Meng Jin, Shuai Li, and Yunhao Liu. mmvib: micrometer-level vibration measurement with mmwave radar. In Proceedings of the 26th Annual International Conference on Mobile Computing and Networking, pages 1-13, 2020.

[30] Benjamin Kempke, Pat Pannuto, Bradford Campbell, and Prabal Dutta. Surepoint: Exploiting ultra wideband flooding and diversity to provide robust, scalable, high-fidelity indoor localization. In Proceedings of the 14th ACM Conference on Embedded Network Sensor Systems CD-ROM, pages 137-149, 2016.

[31] Wei Li and Jinling Wang. Effective adaptive kalman filter for memsimu/magnetometers integrated attitude and heading reference systems. The Journal of Navigation, 66(1):99-113, 2013.

[32] Hongbo Liu, Yu Gan, Jie Yang, Simon Sidhom, Yan Wang, Yingying Chen, and Fan Ye. Push the limit of wifi based localization for smartphones. In Proceedings of the 18th annual international conference on Mobile computing and networking, pages 305-316, 2012.

[33] Yang Liu, Zhenjiang Li, Zhidan Liu, and Kaishun Wu. Real-time arm skeleton tracking and gesture inference tolerant to missing wearable sensors. In Proceedings of the 17th Annual International Conference on Mobile Systems, Applications, and Services, pages 287-299, 2019.

[34] Robert Mahony, Tarek Hamel, and Jean-Michel Pflimlin. Nonlinear complementary filters on the special orthogonal group. IEEE Transactions on automatic control, 53(5):1023-1218, 2008.

[35] Wenguang Mao, Jian He, and Lili Qiu. Cat: high-precision acoustic motion tracking. In Proceedings of the 22nd Annual International Conference on Mobile Computing and Networking, pages 69-81, 2016.

[36] Microsoft. Change handwritten ink to shapes, text, or math in powerpoint for microsoft 365, 2020. https://support.microsoft.com/en-us/topic/changehandwritten-ink-to-shapes-text-or-math-in-powerpoint-for-microsoft-365-0740dec3-6291-4c1f-8baa-011d18449919.

[37] Rajalakshmi Nandakumar, Vikram Iyer, Desney Tan, and Shyamnath Gollakota. Fingerio: Using active sonar for fine-grained finger tracking. In Proceedings of the 2016 CHI Conference on Human Factors in Computing Systems, pages 1515-1525, 2016.

[38] Abhinav Parate, Meng-Chieh Chiu, Chaniel Chadowitz, Deepak Ganesan, and Evangelos Kalogerakis. Risq: Recognizing smoking gestures with inertial sensors on a wristband. In Proceedings of the 12th annual international conference on Mobile systems, applications, and services, pages 149-161, 2014.

[39] Neal Patwari, Lara Brewer, Quinn Tate, Ossi Kaltiokallio, and Maurizio Bocca. Breathfinding: A wireless network that monitors and locates breathing in a home. IEEE Journal of Selected Topics in Signal Processing, 8(1):30-42, 2013.

[40] Urs Ramer. An iterative procedure for the polygonal approximation of plane curves. Computer graphics and image processing, 1(3):244-256, 1972.

[41] Nirupam Roy, Haitham Hassanieh, and Romit Roy Choudhury. Backdoor: Making microphones hear inaudible sounds. In Proceedings of the 15th Annual International Conference on Mobile Systems, Applications, and Services, pages 2-14, 2017.

[42] Nirupam Roy, Sheng Shen, Haitham Hassanieh, and Romit Roy Choudhury. Inaudible voice commands: The long-range attack and defense. In 15th {USENIX} Symposium on Networked Systems Design and Implementation ({NSDI} 18), pages 547-560, 2018.

[43] Longfei Shangguan and Kyle Jamieson. Leveraging electromagnetic polarization in a two-antenna whiteboard in the air. In Proceedings of the 12th International on Conference on emerging Networking EXperiments and Technologies, pages 443-456, 2016.

[44] Sheng Shen, He Wang, and Romit Roy Choudhury. I am a smartwatch and i can track my user's arm. In Proceedings of the 14th annual international conference on Mobile systems, applications, and services, pages 85-96, 2016.

[45] Ke Sun, Wei Wang, Alex X Liu, and Haipeng Dai. Depth aware finger tapping on virtual displays. In Proceedings of the 16th Annual International Conference on Mobile Systems, Applications, and Services, pages 283-295, 2018.

[46] Ke Sun, Ting Zhao, Wei Wang, and Lei Xie. Vskin: Sensing touch gestures on surfaces of mobile devices using acoustic signals. In Proceedings of the $24^{th}$ Annual International Conference on Mobile Computing and Networking, pages 591-605, 2018.

[47] Emily Tate. Sensonor stim3000, June 2020. ttps://www.sensonor.com/products/inertial-measurement-units/stim300/.

[48] David Tse and Pramod Viswanath. Fundamentals of wireless communication. Cambridge university press, 2005.

[49] He Wang, Ted Tsung-Te Lai, and Romit Roy Choudhury. Mole: Motion leaks through smartwatch sensors. In Proceedings of the 21st Annual International Conference on Mobile Computing and Networking, pages 155-166, 2015.

[50] He Wang, Souvik Sen, Ahmed Elgohary, Moustafa Farid, Moustafa Youssef, and Romit Roy Choudhury. No need to war-drive: Unsupervised indoor localization. In Proceedings of the 10th international conference on Mobile systems, applications, and services, pages 197-210, 2012.

[51] Jue Wang, Deepak Vasisht, and Dina Katabi. Rf-idraw: virtual touch screen in the air using rf signals. ACM SIGCOMM Computer Communication Review, 44(4): 235-246, 2014.

[52] Wei Wang, Alex X Liu, and Ke Sun. Device-free gesture tracking using acoustic signals. In Proceedings of the 22nd Annual International Conference on Mobile Computing and Networking, pages 82-94, 2016.

[53] Teng Wei and Xinyu Zhang. mtrack: High-precision passive tracking using millimeter wave radios. In Proceedings of the 21st Annual International Conference on Mobile Computing and Networking, pages 117-129, 2015.

[54] Dan Wu, Ruiyang Gao, Youwei Zeng, Jinyi Liu, Leye Wang, Tao Gu, and Daqing Zhang. Fingerdraw: Subwavelength level finger motion tracking with wifi signals. Proceedings of the ACM on Interactive, Mobile, Wearable and Ubiquitous Technologies, 4(1):1-27, 2020.

[55] Ning Xiao, Panlong Yang, Xiang-Yang Li, Yanyong Zhang, Yubo Yan, and Hao Zhou. Milliback: Real-time plug-n-play millimeter level tracking using wireless backscattering. Proceedings of the ACM on Interactive, Mobile, Wearable and Ubiquitous Technologies, 3(3):1-23, 2019.

[56] Chao Xu, Parth H Pathak, and Prasant Mohapatra. Finger-writing with smartwatch: A case for finger and hand gesture recognition using smartwatch. In Proceedings of the 16th International Workshop on Mobile Computing Systems and Applications, pages 9-14, 2015.

[57] Chenren Xu, Bernhard Firner, Robert S Moore, Yanyong Zhang, Wade Trappe, Richard Howard, Feixiong Zhang, and Ning An. Scpl: Indoor device-free multisubject counting and localization using radio signal strength. In Proceedings of the 12th international conference on Information processing in sensor networks, pages 79-90, 2013.

[58] Lei Yang, Yekui Chen, Xiang-Yang Li, Chaowei Xiao, Mo Li, and Yunhao Liu. Tagoram: Real-time tracking of mobile rfid tags to high precision using cots devices. In Proceedings of the 20th annual international conference on Mobile computing and networking, pages 237-248, 2014.

[59] Seanglidet Yean, Bu Sung Lee, Chai Kiat Yeo, and Chan Hua Vun. Algorithm for 3d orientation estimation based on kalman filter and gradient descent. In 2016 IEEE 7th Annual Information Technology, Electronics and Mobile Communication Conference (IEMCON), pages 1-6. IEEE, 2016.

[60] Huanpu Yin, Anfu Zhou, Guangyuan Su, Bo Chen, Liang Liu, and Huadong Ma. Learning to recognize handwriting input with acoustic features. Proceedings of the ACM on Interactive, Mobile, Wearable and Ubiquitous Technologies, 4(2):1-26, 2020.

[61] Tuo Yu, Haiming Jin, and Klara Nahrstedt. Mobile devices based eavesdropping of handwriting. IEEE Transactions on Mobile Computing, 2019.

[62] Sangki Yun, Yi-Chao Chen, and Lili Qiu. Turning a mobile device into a mouse in the air. In Proceedings of the 13th Annual International Conference on Mobile Systems, Applications, and Services, pages 15-29, 2015.

[63] Sangki Yun, Yi-Chao Chen, Huihuang Zheng, Lili Qiu, and Wenguang Mao. Strata: Fine-grained acoustic-based device-free tracking. In Proceedings of the 15th annual international conference on mobile systems, applications, and services, pages 15-28, 2017.

[64] Bing Zhou, Jay Lohokare, Ruipeng Gao, and Fan Ye. Echoprint: Two-factor authentication using acoustics and vision on smartphones. In Proceedings of the 24th Annual International Conference on Mobile Computing and Networking, pages 321-336, 2018.

What is claimed:

1. A system comprising:
    a localization device configured to interface to a handheld or hand-enclosed instrument comprising an instrument body and an ultra-wide band antenna and communication interface), the localization device comprising:
        a plurality of antennas operably connected to an ultra-wide band controller to receive a plurality of unidirectional ultra-wide band signals from the ultra-wide band antenna of the handheld or hand-enclosed instrument; and
        the controller comprising a processor unit or logic circuit, the processor unit or logic circuit being configured to:
            measure a plurality of time measurements and one or more phase measurements of a plurality of signals received by the plurality of antennas from the ultra-wide band antenna of the handheld or hand-enclosed instrument;
            determine a time-difference of arrival (TDOA) measurements, or values derived therefrom, using the plurality of measured time measurements and the one or more measured phase measurements; and determine at least one localization measurement value of the ultra-wide band antenna of the handheld or hand-enclosed instrument based on the TDOA measurements, or values derived therefrom;

wherein at least the at least one localization measurement value or a parameter derived therefrom is employed as one or more inputs, in a real-time control loop, to a software application that uses the handheld or hand-enclosed instrument as an input user interface.

2. The system of claim 1, further comprising:

an ultra-wide band antenna and communication interface; and a controller, the controller comprising a second processor unit and a second memory having instructions stored thereon, wherein execution of the instructions by the second processor cause the second processor to:

measure a plurality of time measurements and one or more phase measurements of a plurality of unidirectional signals received by the ultra-wide band antenna from a plurality of antennas of a base station system;

determine time-difference of arrival (TDOA) measurements, or values derived therefrom, using the plurality of measured time measurements and the one or more measured phase measurements; and determine at least one localization measurement value of the ultra-wide band antenna of the handheld or hand-enclosed instrument based on the TDOA measurements, or values derived therefrom;

wherein at least the at least one localization measurement value or a parameter derived therefrom is employed as one or more inputs, in a real-time control loop, to a software application that uses the handheld or hand-enclosed instrument as an input user interface.

3. The system of claim 1, wherein two or more of the plurality of antennas are connected to the controller through a corresponding set of delay-adjusting connections, including a first delay-adjusting connection and a second delay-adjusting connection, wherein the first delay-adjusting connection comprises a first cable length and/or electronic component that add a first time or phase delay to (i) a first time measurement of the plurality of time measurements and/or a first phase measurement of the one or more phase measurements, wherein the second delay-adjusting connection comprises a second cable length and/or electronic component that add a second time or phase delay to (i) a second time measurement of the plurality of time measurements and/or a second phase measurement of the one or more phase measurements, and wherein the first time or phase delay and the second time or phase delay are different.

4. The system of claim 3, wherein the first delay-adjusting connection has a first signal amplitude attenuation characteristic, wherein the second delay-adjusting connection has a second signal amplitude attenuation characteristic, wherein the first signal amplitude attenuation characteristic is different from the second signal amplitude attenuation characteristic.

5. The system of claim 1, wherein the plurality of unidirectional ultra-wide band signals comprises a plurality of RF pulses, wherein the measure of the plurality of time measurements and the one or more phase measurements of a plurality of unidirectional signals includes:

interpolating a portion of the plurality of RF pulses associated with a peak RF pulse to generate a plurality of interpolated signals; and determining a maximum measure of the plurality of interpolated signals as the plurality of time measurements and the one or more phase measurements.

6. The system of claim 1, wherein the handheld or hand-enclosed instrument comprises an orientation sensor, and wherein the processor unit is further configured by instructions or circuitry to:

receive orientation measurements, or values derived therefrom, from the orientation sensor;

determine at least one orientation measurement value based on the orientation measurements; and determine at least one second localization measurement value of a landmark of the handheld or hand-enclosed instrument via a pre-defined transform operator of (i) the at least one orientation measurement value and (ii) at least one of the (a) TDOA measurements, or values derived therefrom or (b) the at least one localization measurement value of the ultra-wide band antenna, wherein the at least one second localization measurement value or a parameter derived therefrom is employed as one or more inputs, in the real-time control loop, to a software application that uses the handheld or hand-enclosed instrument as an input user interface.

7. The system of claim 1, wherein the handheld or hand-enclosed instrument comprises an orientation sensor and a contact sensor, and wherein the processor unit is further configured by instructions or circuitry to:

receive orientation measurements, or values derived therefrom, from the orientation sensor;

receive contact measurements, or values derived therefrom, from the contact sensor;

determine at least one contact measurement value based on the contact measurements; and determine at least one second localization measurement value of a landmark of the handheld or hand-enclosed instrument via a pre-defined transform operator using:

(i) the at least one orientation measurement value and (ii) at least one of the (a) TDOA measurements, or values derived therefrom or (b) the at least one localization measurement value of the ultra-wide band antenna, wherein at least (i) the at least one second localization measurement value or a parameter derived therefrom and (ii) the at least one contact measurement value are concurrently employed as one or more inputs, in the real-time control loop, to a software application that uses the handheld or hand-enclosed instrument as an input user interface.

8. The system of claim 1, wherein the handheld or hand-enclosed instrument comprises an orientation sensor, and wherein the processor unit is further configured by instructions or circuitry to:

receive orientation measurements, or values derived therefrom, from the orientation sensor; and determine at least one orientation measurement value based on the orientation measurements;

wherein at least (i) the at least one localization measurement value or a parameter derived therefrom and (ii) the at least one orientation measurement value are concurrently employed as one or more inputs, in the real-time control loop, to a software application that uses the handheld or hand-enclosed instrument as an input user interface.

9. The system of claim 1, wherein the handheld or hand-enclosed instrument comprises an orientation sensor and a contact sensor, and wherein the processor unit is further configured by instructions or circuitry to:

receive orientation measurements, or values derived therefrom, from the orientation sensor;

receive contact measurements, or values derived therefrom, from the contact sensor; and determine at least one contact measurement value based on the contact measurements; and determine at least one orientation measurement value based on the orientation measurements;

wherein at least (i) the at least one localization measurement value or a parameter derived therefrom, (ii) the at least one orientation measurement value, and (iii) the at least one contact measurement value are concurrently employed as one or more inputs, in the real-time control loop, to a software application that uses the handheld or hand-enclosed instrument as an input user interface.

10. The system of claim 6, wherein the controller is configured to maintain a first tracking parameter of the plurality of time measurements and/or the one or more phase measurements, and wherein the controller is further configured to re-calibrate and/or adjust the first tracking parameter via a fusion operation using at least outputs of the orientation sensor.

11. The system of claim 10, wherein the controller is configured to maintain a second tracking parameter of the orientation measurements, and wherein the controller is further configured to re-calibrate and/or adjust the second tracking parameter via the fusion operation using at least the first tracking parameter of the plurality of time measurements and/or the one or more phase measurements.

12. The system of claim 7, wherein the contact sensor comprises a pressure sensor positioned on a surface of the instrument body to be held by a user, and wherein contact is determined based on an elevated pressure being sensed by the pressure sensor.

13. The system of claim 7, wherein the contact sensor comprises a laser rangefinder or a photodiode assembly configured to interrogate a surface to determine when contact is made with said surface.

14. The system of claim 7, wherein (i) the orientation measurements, or values derived therefrom, and/or (ii) the contact measurements, or values derived therefrom, are embedded and/or encoded in the plurality of signals.

15. The system of claim 7, wherein (i) the orientation measurements, or values derived therefrom, and/or (ii) the contact measurements, or values derived therefrom, are transmitted through (i) a second communication channel in at least one of the plurality of ultra-wide band signals or (ii) a separate second communication channel associated with the localization device.

16. The system of claim 15, wherein the localization device further comprises a second ultra-wide band controller or a RF controller configured to receive the orientation measurements, or values derived therefrom, and/or the contact measurements, or values derived therefrom, from the handheld or hand-enclosed instrument.

17. The system of claim 1, wherein the handheld or hand-enclosed instrument is configured as a writing instrument, the system further comprising a writing surface apparatus having a dimension greater than 2 feet by 3 feet, wherein the plurality of antennas are positioned at a first position, a second position, and a third position on or near the writing surface apparatus.

18. The system of claim 6, wherein the handheld or hand-enclosed instrument is configured as a sculpting instrument, wherein the plurality of antennas are fixably positioned at a first position, a second position, and a third position around a surface of a workpiece, and wherein the localization device is configured to map or operate upon a three-dimensional surface position of the workpiece using (i) the at least one localization measurement value or (ii) the at least one second localization measurement value.

19. A non-transitory computer-readable medium having instructions stored thereon to perform localization of a hand-held or hand-enclosed instrument, wherein execution of the instructions by a processor causes the processor to:

receive a plurality of time measurements and one or more phase measurements of a plurality of signals received by a plurality of antennas from an ultra-wide band antenna of a handheld or hand-enclosed instrument;

determine a time-difference of arrival (TDOA) measurements, or values derived therefrom, using the plurality of measured time measurements and the one or more measured phase measurements; and determine at least one localization measurement value of the ultra-wide band antenna of the handheld or hand-enclosed instrument based on the TDOA measurements, or values derived therefrom;

wherein the at least one localization measurement value or a parameter derived therefrom is employed, in a real-time control loop, as one or more inputs to a software application that uses the handheld or hand-enclosed instrument as an input user interface.

20. A method comprising:

transmitting by a first device one or more ultra-wide band signals; and receiving by a second device the transmitted one or more ultra-wide band signals;

measuring, via analog and/or digital circuitries, a plurality of time measurements and one or more phase measurements of a plurality of signals received by a plurality of antennas from a ultra-wide band antenna of a handheld or hand-enclosed instrument;

determining, by a processor, a time-difference of arrival (TDOA) measurements, or values derived therefrom, using the plurality of measured time measurements and the one or more measured phase measurements; and determining, by the processor, at least one localization measurement value of the ultra-wide band antenna of the handheld or hand-enclosed instrument based on the TDOA measurements, or values derived therefrom;

wherein at least the at least one localization measurement value or a parameter derived therefrom is employed as one or more inputs, in a real-time control loop, to a software application that uses the handheld or hand-enclosed instrument as an input user interface.

* * * * *